United States Patent [19]

Oida et al.

[11] Patent Number: 5,581,668
[45] Date of Patent: Dec. 3, 1996

[54] METHOD AND APPARATUS FOR PROCESSING DATA

[75] Inventors: Jun Oida, Kawasaki; Naohisa Suzuki, Yokohama; Koji Fukunaga, Tokyo; Masaki Nishiyama, Yokohama; Tsutomu Takahashi, Kawasaki; Jiro Tateyama, Yokohama; Hisatsugu Naito, Tokyo, all of Japan

[73] Assignee: Canon Kabushiki Kaisha, Tokyo, Japan

[21] Appl. No.: 920,393

[22] Filed: Jul. 27, 1992

[30] Foreign Application Priority Data

Jul. 30, 1991 [JP] Japan .................... 3-190336
Jul. 30, 1991 [JP] Japan .................... 3-190337
Jul. 30, 1991 [JP] Japan .................... 3-190342

[51] Int. Cl.⁶ .................................... G06F 15/00
[52] U.S. Cl. .......................... 395/113; 395/112
[58] Field of Search .................... 395/113, 112, 395/101, 114, 109; 358/406, 404, 444, 296; 347/19, 142; 355/203, 204, 206, 207, 208, 209, 205, 228, 285, 308, 311; 400/663, 669

[56] References Cited

U.S. PATENT DOCUMENTS

| | | | |
|---|---|---|---|
| 4,707,715 | 11/1987 | Miura | 346/160 |
| 4,740,096 | 4/1988 | Nakanishi | 400/663 |
| 5,016,052 | 5/1991 | Sambayashi et al. | 355/228 |

FOREIGN PATENT DOCUMENTS

| | | |
|---|---|---|
| 0366250 | 5/1990 | European Pat. Off. . |
| 0426036 | 5/1991 | European Pat. Off. . |
| 62-247416 | 10/1987 | Japan . |
| 63-246268 | 10/1988 | Japan . |

Primary Examiner—Arthur G. Evans
Assistant Examiner—Dov Popovici
Attorney, Agent, or Firm—Fitzpatrick, Cella, Harper & Scinto

[57] ABSTRACT

A method and apparatus for processing data, with the data processing side performing main control and the print control side including control for saving power. The print control side performs transition of a plurality of power saving states to obtain an optimal power saving state on the basis of transfer of data from the main control side, and the data processing side performs various control operations independently of the transition of the plurality of power saving states.

13 Claims, 28 Drawing Sheets

PFM/IO REGISTER

PBJ/IO REGISTER

RAM #2 ADDRESS MAP

FIG. 15

| ADDRESS | DEVICE | | |
|---|---|---|---|
| 0000H-001FH | DMAC 1 (8237) | | |
| 0020H-0021H | IRQC 1 (8259A) | ADDRESSES IN RIGHT COL ARE USED IN ACTUAL ADDRESS DECODING | 0020H-003FH |
| 0040H-0043H | SYSTEM TIMER (8254) | | 0040H-005FH |
| 0060H-0064H | KB (8042) | | 0060H-006FH |
| 0070H-0071H | RTC, NMI MASK | | 0070H-007FH |
| 0080H-008FH | DMA BANK REGISTER | | 0080H-009FH |
| 00A0H-00A1H | IRQC 2 (8259A) | | 00A0H-00BFH |
| 00C0H-00DFH | DMAC 2 (8237) | | |
| 00F0H-00FFH | FPU | | |
| 01F0H-01FFH | HDC | | |
| 0200H-0207H | GAME I/O | | |
| 0278H-027FH | PARALLEL CENTRONICS (PRINTER PORT 3) | | |
| 02F8H-02FFH | RS-232C PORT 2 | | |
| 0300H-031FH | RESERVED | | |
| 0360H-036FH | RESERVED | | |
| 0370H-0377H | RESERVED | | |
| 0378H-037FH | PARALLEL CENTRONICS (PRINTER PORT 2) | | |
| 0380H-03AFH | RESERVED | | |
| 03B0H-03BBH | VIDEO CONTROLLER | | |
| 03BCH-03BFH | PARALLEL CENTRONICS (PRINTER PORT 1) | | |
| 03C0H-03DFH | VIDEO CONTROLLER | | |
| 03E0H-03EFH | RESERVED | | |
| 03F0H-03F7H | FDC | | |
| 03F8H-03FFH | RS-232C PORT 1 | | |

SYSTEM BOARD ONLY: 0000H-001FH through 00F0H-00FFH

FIG. 16

| INTR NO. | USES | |
|---|---|---|
| 00H | SUBTRACTION ERROR | |
| 01H | SINGLE STEP | |
| 02H | NMI | |
| 03H | BREAK POINT | |
| 04H | OVERFLOW | |
| 05H | PRINT SCREEN (W-SIDES HARD COPY) | |
| 06H | RESERVED | |
| 07H | RESERVED | |
| 08H | IRQ0 TIMER INTERRUPT | (MASTER) |
| 09H | IRQ1 KB HARDWARE INTERRUPT | (MASTER) |
| 0AH | IRQ2 CASCADE CONNECTION OF IRQC 2 | (MASTER) |
| 0BH | IRQ3 SERIES PORT 2 INTERRUPT | (MASTER) |
| 0CH | IRQ4 SERIES PORT 1 INTERRUPT | (MASTER) |
| 0DH | IRQ5 PARALLEL PORT 3 INTERRUPT | (MASTER) |
| 0EH | IRQ6 DISC CONTROLLER INTERRUPT | (MASTER) |
| 0FH | IRQ7 PARALLEL PORTS 1 & 2 INTERRUPT | (MASTER) |
| 10H | VIDEO BIOS CALL | |
| 11H | SYSTEM STRUCTURE | |
| 12H | MEMORY SIZE | |
| 13H | DISC BIOS CALL | |
| 14H | RS - 232C BIOS CALL | |
| 15H | OTHER SYSTEM CALL | |
| 16H | KB BIOS CALL | |
| 17H | PRINTER BIOS CALL | |
| 18H | RESERVED | |
| 19H | BOOTSTRAP | |
| 1AH | TIMER SERVICE | |
| 1BH | KB BREAK | |
| 1CH | USER TIMER INTERRUPT | |
| 1DH | VIDEO PARAMETER | |
| 1EH | FLOPPY DISC PARAMETER | |
| 1FH | GRAPHICS CHARACTER | |

FIG. 17

| INTR NO. | USES |
|---|---|
| 20H~32H | MS - DOS FUNCTION CALL |
| 33H | MOUSE DRIVER |
| 34H~3FH | MS - DOS RESERVED |
| 40H~5FH | RESERVED FOR BIOS |
| 60H~66H | FOR USER PROGRAM INTERRUPT |
| 67H | LIM EMS DRIVER |
| 68H~6FH | RESERVED |
| 70H | IRQ8 RTC INTERRUTT (SLAVE) |
| 71H | IRQ9 INT 0AH DIRECT (SLAVE) |
| 72H | IRQ10 RESERVED (SLAVE) |
| 73H | IRQ11 RESERVED (SLAVE) |
| 74H | IRQ12 RESERVED (SLAVE) |
| 75H | IRQ13 FPU INTERRUPT (SLAVE) |
| 76H | IRQ14 HD INTERRUPT (SLAVE) |
| 77H | IRQ15 RESERVED (SLAVE) |
| 78H~F0H | RESERVED |
| F1H~FFH | RESERVED FOR AX SYSTEM |

[ NOTE ]
- INT 08H-0FH & INT 70H-77H : HARDWARE INTERRUPT
- INT 86H-F0H : RESERVED FOR BASIC EXECUTION IN PC/AT

PRINTER CONTROL SECTION POWER/SAVE-MANAGEMENT FLOW (1)

PRINTER CONTROL SECTION POWER/SAVE-MANAGEMENT FLOW (2)

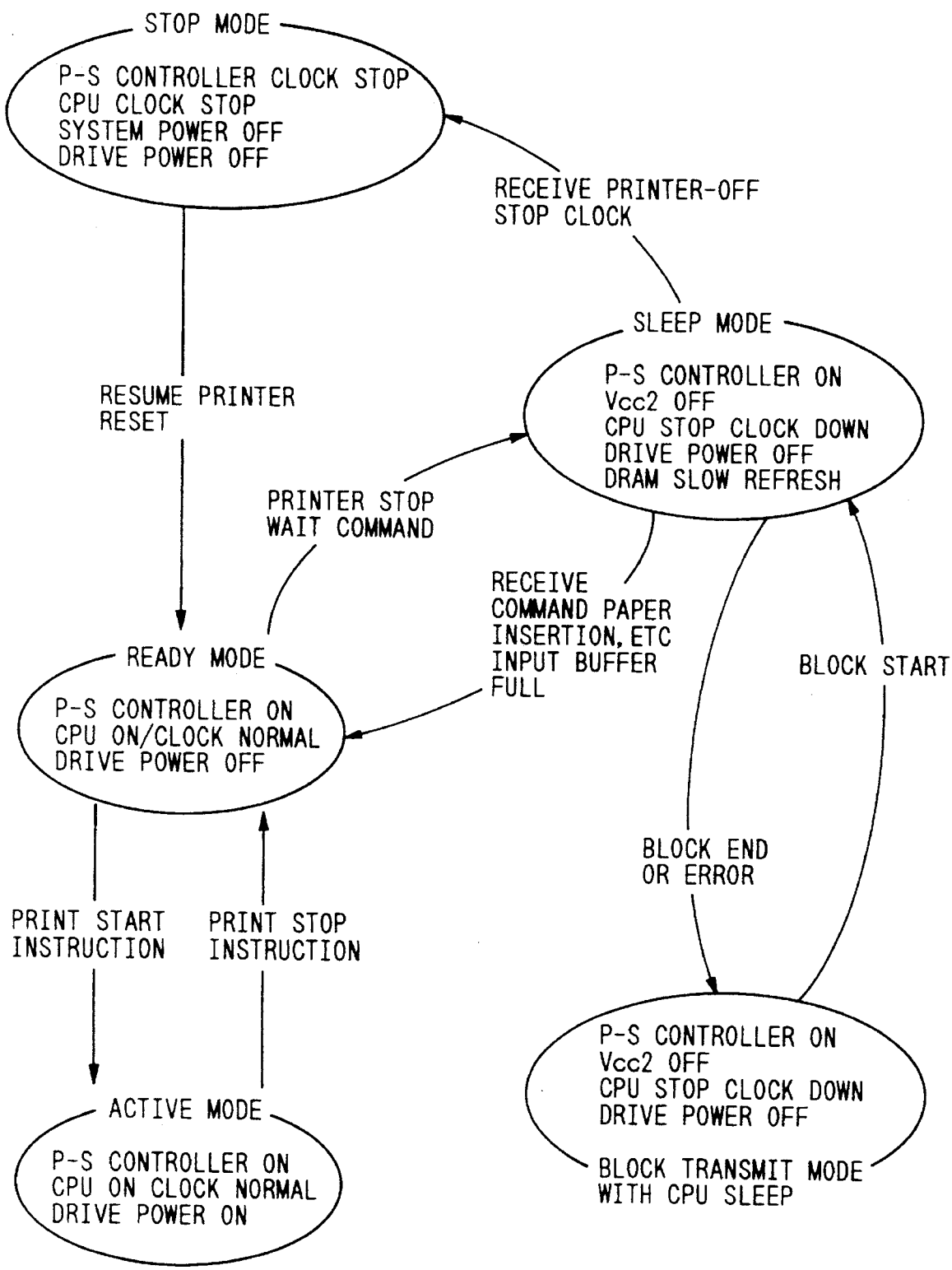

METHOD AND APPARATUS FOR PROCESSING DATA

BACKGROUND OF THE INVENTION

1. Field of the Invention

The present invention relates to a method and apparatus for processing data, in which a power saving state is set in inoperative states of the respective components in a system equipment and these components are sequentially controlled to achieve power saving of the overall system.

2. Related Background Art

In a system equipment having a data processing unit as a main controller and a print controller to independently control the data processing unit and the print controller, when power saying of a printer unit of the system equipment is taken into consideration, transition states such as a stop state and a ready state are set and controlled by the main controller.

In the prior art described above, however, busy states occur at respective locations for the sake of operation convenience of the printer unit, and the main controller waits until these busy states are cleared. When data such as print data is to be transferred to the printer unit, it cannot be accepted unless the printer unit is ready, thus wasting time and power.

In the above prior art, however, in transfer of print data from the data processing unit, after the data processing unit and a power saving controller set the printer unit in a ready state, the printer unit receives data but is kept in the ready state until a print instruction is received, thereby wasting power.

In a conventional system having a data processing unit as a main controller and a print controller, power saving control of a printer unit is performed by a power saving controller in the data processing unit, and supply of power to the printer unit is performed in accordance with a supply instruction. The printer unit is powered off in response to a power-off instruction in accordance with status data representing an operating state or the like of the printer unit.

In this prior art system, the main controller must always monitor the status data, thereby wasting time and power.

SUMMARY OF THE INVENTION

It is an object of the present invention to include a power saving controller in a print controller in addition to one in a main controller so that the power saving controller in the print controller manages and controls transition of a power saving state, and transition can be achieved by detection signals from various input means such as a paper end sensor for detecting the presence of paper in addition to an instruction from the main controller, thereby performing power saving control of a print controller and instruction data transfer thereto without causing the main controller to manage the printer unit.

It is another object of the present invention to perform a control method capable of performing data transfer of print data and the like even if the printer unit is set in a power saving state.

It is still another object of the present invention to also include a power saving controller in a printer unit so that transition from a ready state to a power saving state can be performed by this power saving controller upon reception of print data from the main controller.

It is still another object of the present invention to also include a power saving controller in a printer unit, so that when a printer unit power-off instruction is sent before the main controller is shifted to a power saving state, the printer unit power-off instruction is received by the power saving controller in the printer unit even if the printer unit is set in the power saving state, thereby performing power-off control of the printer unit in which the status conditions of the respective components of the printer unit are determined and if any printer unit component is being operated, the printer unit is powered off upon operation completion of such ON component.

BRIEF DESCRIPTION OF THE DRAWINGS

FIG. 15 is an I/O space address map of the host;

FIG. 16 is a view showing the contents of an interruption vector;

FIG. 17 is a view showing the contents of an interruption vector;

FIG. 29 is a view showing changes in states of a printer system according to the third embodiment.

DETAILED DESCRIPTION OF THE PREFERRED EMBODIMENT

Figure 1:
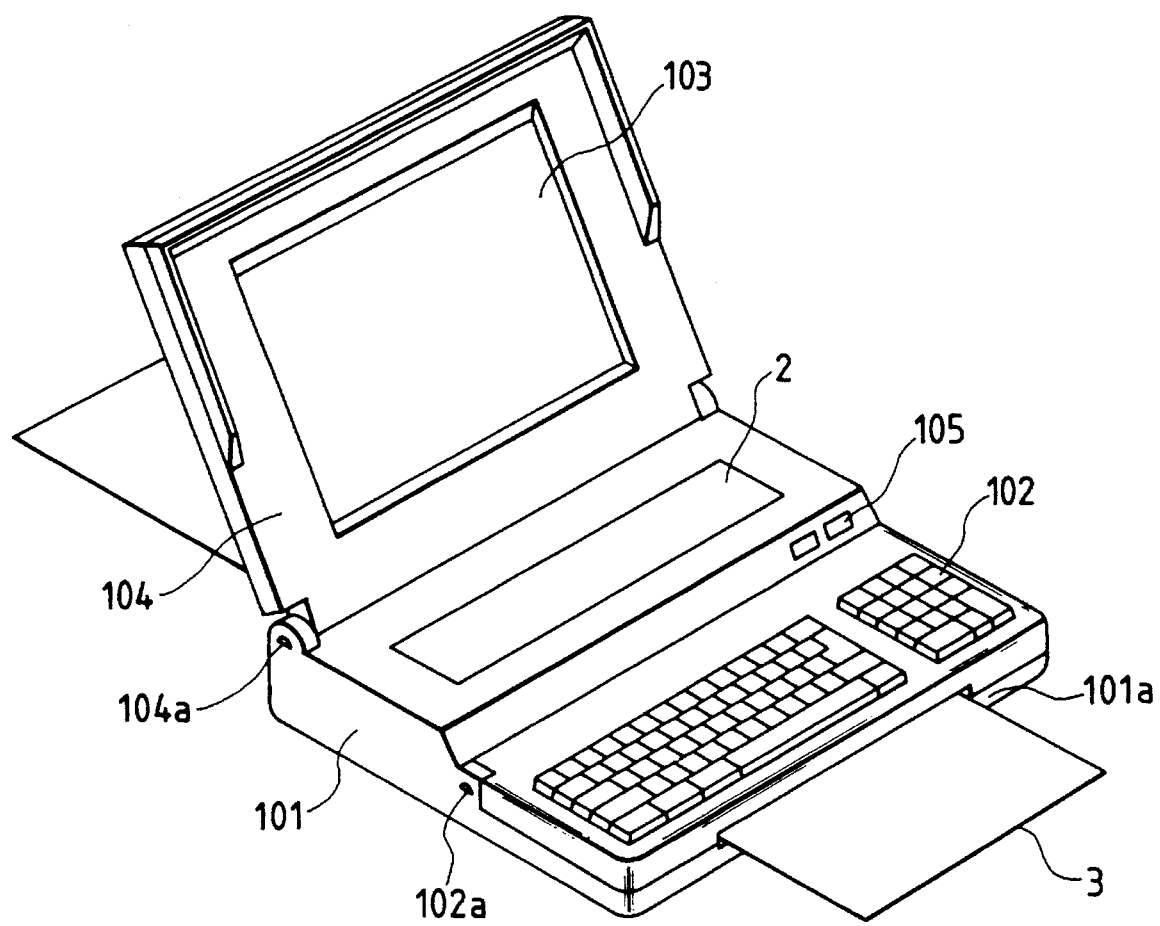
FIG. 1 is a perspective view showing a personal computer in which the present invention is embodied.

FIG. 1 is a perspective view showing a personal computer as a data processing apparatus according to the present invention. A personal computer 1 is constituted by components such as an apparatus main body 101, a keyboard 102, an upper cover 104 having a display unit 103, and a printer unit 2. The upper cover 104 is pivotally mounted on the apparatus main body 101 through hinges 104a mounted at both ends of the rear end of the apparatus main body 101. When the apparatus is in use, the upper cover 104 is pivoted and opened to a position where the display unit 103 can be easily observed by an operator. However, when the apparatus is not used, the upper cover 104 is closed and serves as a cover of the apparatus main body 101. A liquid crystal display element is used as a display element of the display unit 103 because the liquid crystal display element has a low profile.

A printer unit having an ink-jet recording head is located in front of the display unit 103 and is housed in the apparatus main body 101. The printer unit 2 has an opening (not shown) which can be opened or closed by the operator, so that the recording head can be easily replaced with a new one.

Recording paper 3 is inserted from a paper feed port 101a formed in the lower portion of the keyboard 102. The recording paper 3 is conveyed through a convey path extending through the apparatus main body 101 and is discharged through a discharge port (not shown) located on the rear side of the apparatus. The keyboard 102 is pivotally mounted through hinges 102a mounted at both side edges of the apparatus main body 101. Even if recording paper having a relatively short length, such as an envelope or a postcard is used, the upper portion of the keyboard 102 can be opened, and the recording paper 3 can be inserted in the convey path. In this manner, since the convey path for the recording paper 3 is formed in the lower portion of the keyboard 102, various operations using the keyboard 102, the display unit 103, and a printer operation switch SW105 can be performed in a state wherein the recording paper is set in the convey path.

[Schematic Block Diagram of Host-Printer]

Figure 2:
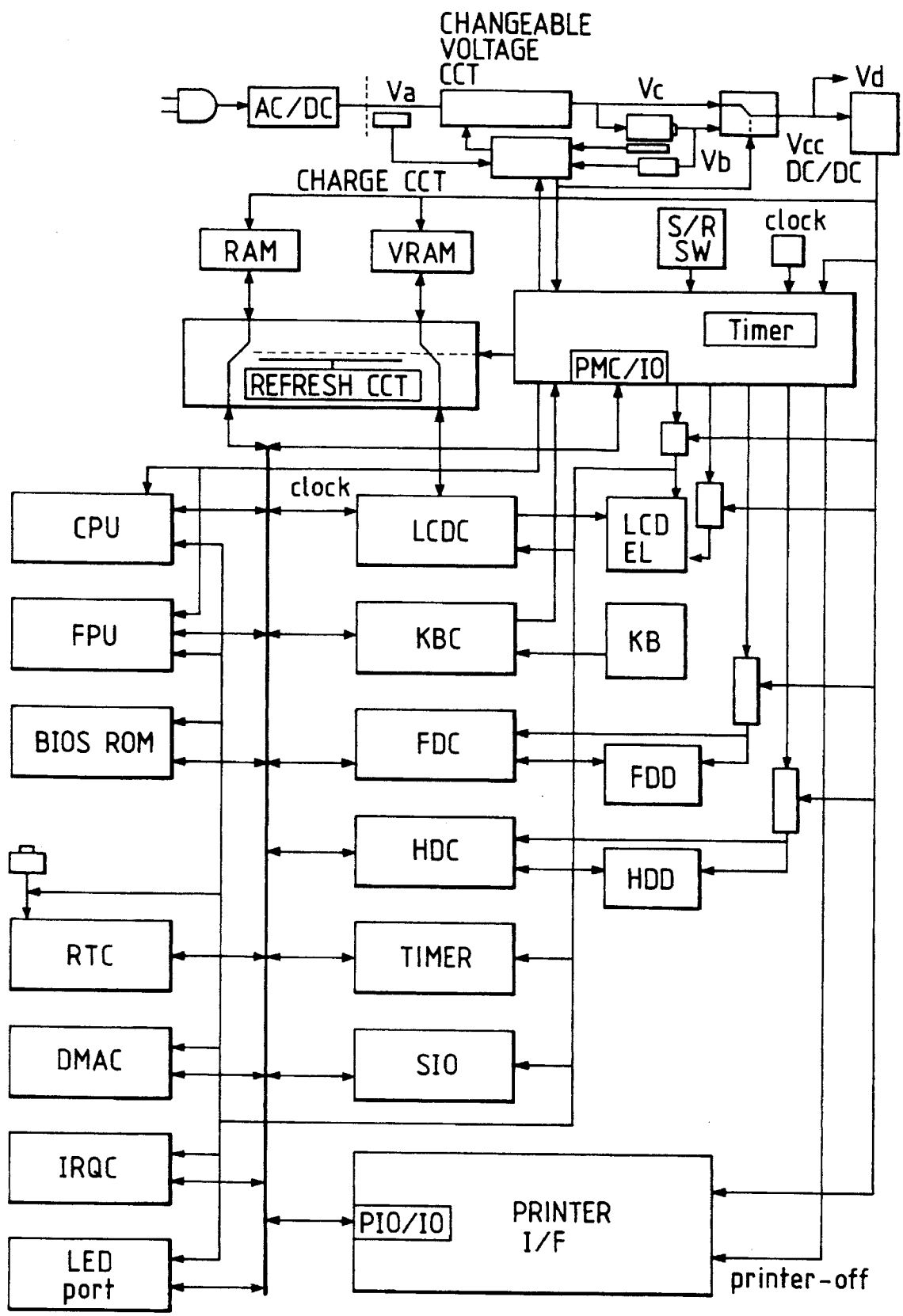
FIG. 2 is a schematic block diagram of a host and a printer.

FIG. 2 is a schematic block diagram of the host computer and the printer.

In the host computer, a central processing unit (CPU) manages the main control. A BIOS ROM (Basic Input Output System ROM) instructs basic control of the CPU. An application program is read out from a floppy disc (FDD) or a hard disc (HDD) through a floppy disc controller (FDC) or a hard disc controller (HDC), and the application program is executed. At this time, as a screen display method, characters and the like are displayed on a liquid crystal display (LCD) using an LCD controller (LCDC). A key input from the keyboard (KB) is entered through a keyboard controller (KBC). A numeric operation processor (FPU) supports arithmetic processing of the CPU. A real-time clock (RTC) represents a time lapse at the present moment. Even if the system is powered off, the RTC is backed up by an RTC battery. A DMA controller (DMAC) performs data transfer without going through the CPU so as to perform high-speed data transfer between memories, between a memory and an I/O, and between I/Os. An interrupt controller (IRQC) receives an interrupt from each I/O and performs operations in accordance with a priority order. A timer (TIMER) has free-running timers of several channels and performs various time management operations. In addition, the system shown in FIG. 2 includes a serial interface (SIO), an extension port (PORT), and an LED indicating an operating state to the user.

In addition to the above functions of the general personal computer, a notebook type personal computer must operate with at least two power sources, i.e., an AC adapter and a battery. The notebook type personal computer requires power saving particularly while it is battery-operated. For this purpose, the notebook type personal computer comprises: a host power management unit (host PM unit) for performing time control for an on/off operation of an EL inverter, power supply to the FDD, power supply to the HDD, a printer-off operation, power supply to devices except for the RAM and VRAM, CLOCK control of the CPU and the like, and power supply control procedures in a suspend/resume mode; a refresh controller for switching to refresh the RAM and VRAM between the suspend mode and a CPU-CLOCK mode in accordance with an instruction signal from the host PM unit; and a charge controller capable of driving the host while charging the secondary battery.

The printer is connected to the host computer through a general-purpose parallel I/F. The printer exchanges data on the I/O port register level and has an image equivalent to that exchanged with an external printer.

[Circuit Diagram of Arrangement of Printer Driver]

Figure 4:
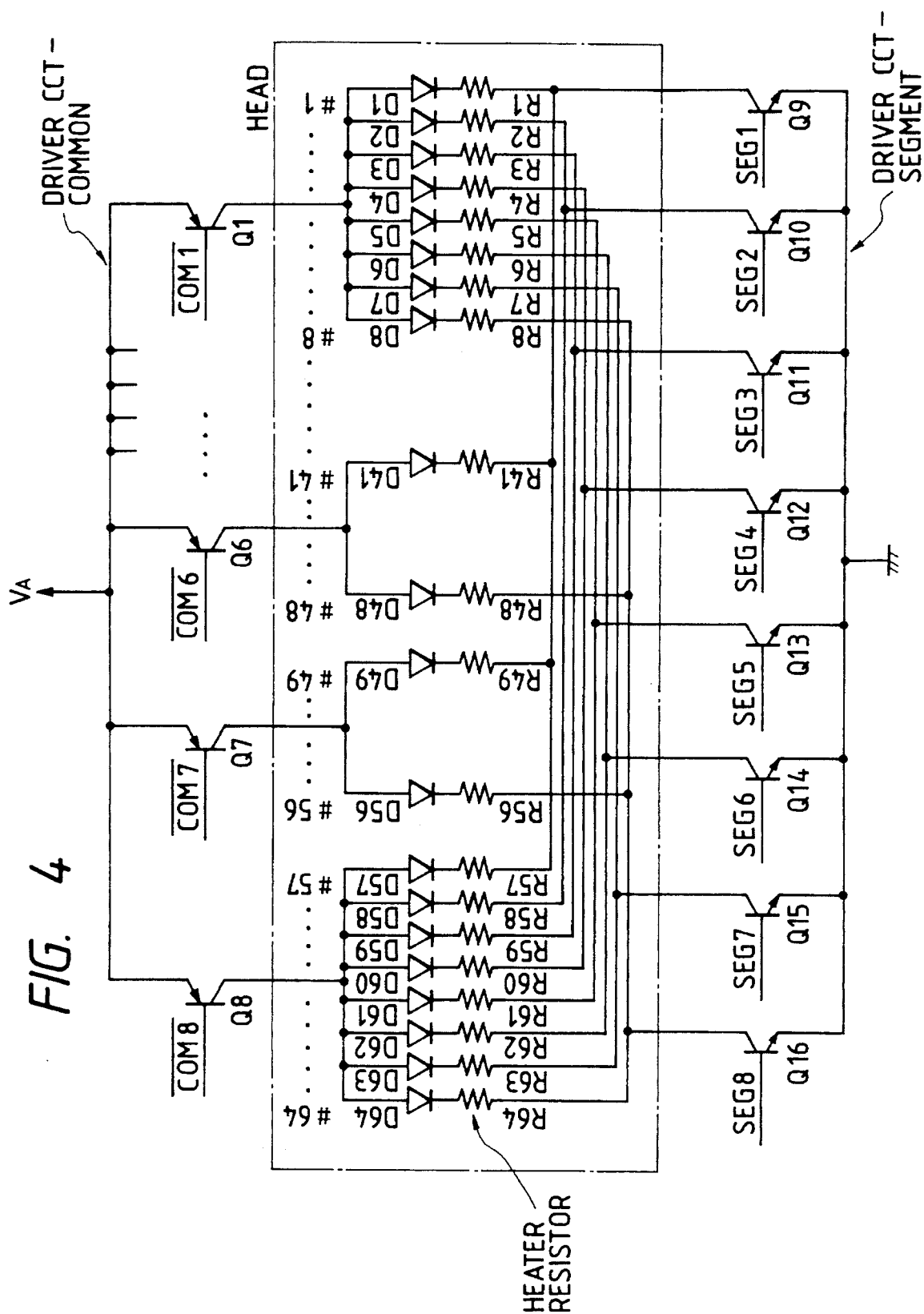
FIG. 4 is a circuit diagram of a recording head and a head driver.

FIG. 4 shows arrangements of the recording or BJ head and the head driver.

A jet unit of this embodiment has 64 orifices, the positions of which are respectively numbered with #1 to #64. Heater resistors R1 to R64 serve as jet energy generation elements arranged in correspondence with orifices #1 to #64, respectively. The heater resistors R1 to R64 are divided into blocks each consisting of eight heater resistors. Switching transistors Q1 to Q8 of a driver circuit-common are respectively connected to the blocks, respectively. The transistors Q1 to Q8 enable or disable energization paths in accordance with ON/OFF states of control signals COM1 to COM8, respectively. Reverse bias preventive diodes D1 to D64 are respectively located in the energization paths to the heater resistors R1 to R64.

ON/OFF transistors Q9 to Q16 of a driver circuit-segment are connected to the heater resistors located at corresponding positions between the blocks. The transistors Q1 to Q16 enable or disable energization paths to the heater resistors in accordance with ON/OFF states of control signals SEG1 to SEG8.

Figure 5:
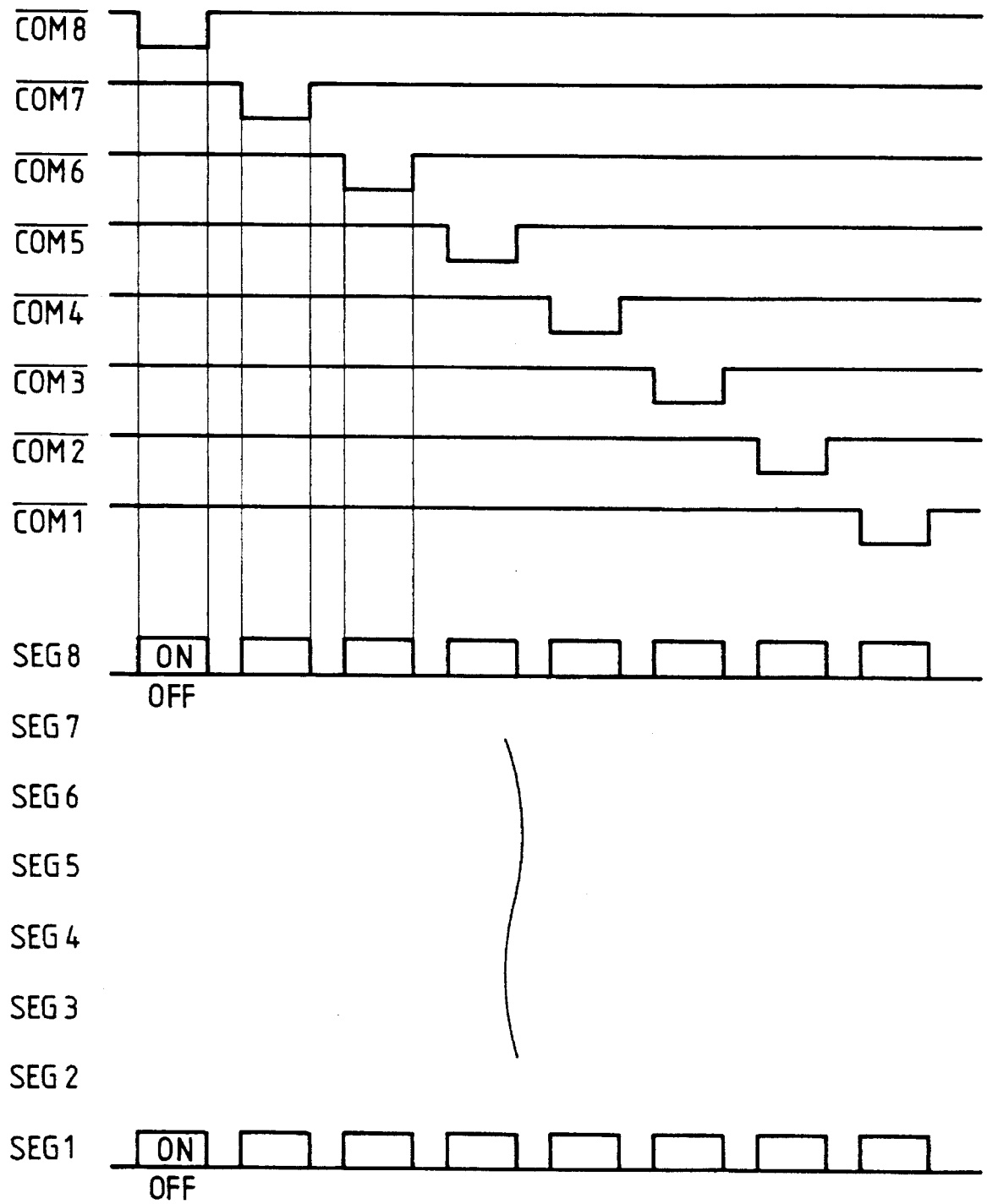
FIG. 5 is a timing chart for driving the recording head shown in FIG. 4.

FIG. 5 is a timing chart of head driving timing in the above arrangement. At a given position in a head scanning direction, the common control signals COM8 to COM1 are sequentially enabled. By this enable operation, one block is selected and is set in an energization enable state. The segment control signals SEG8 to SEG1 are enabled or disabled in accordance with an image within the selected block, so that the heater resistors are selectively energized. Ink jets are formed upon heating to perform dot recording.

Figure 13:
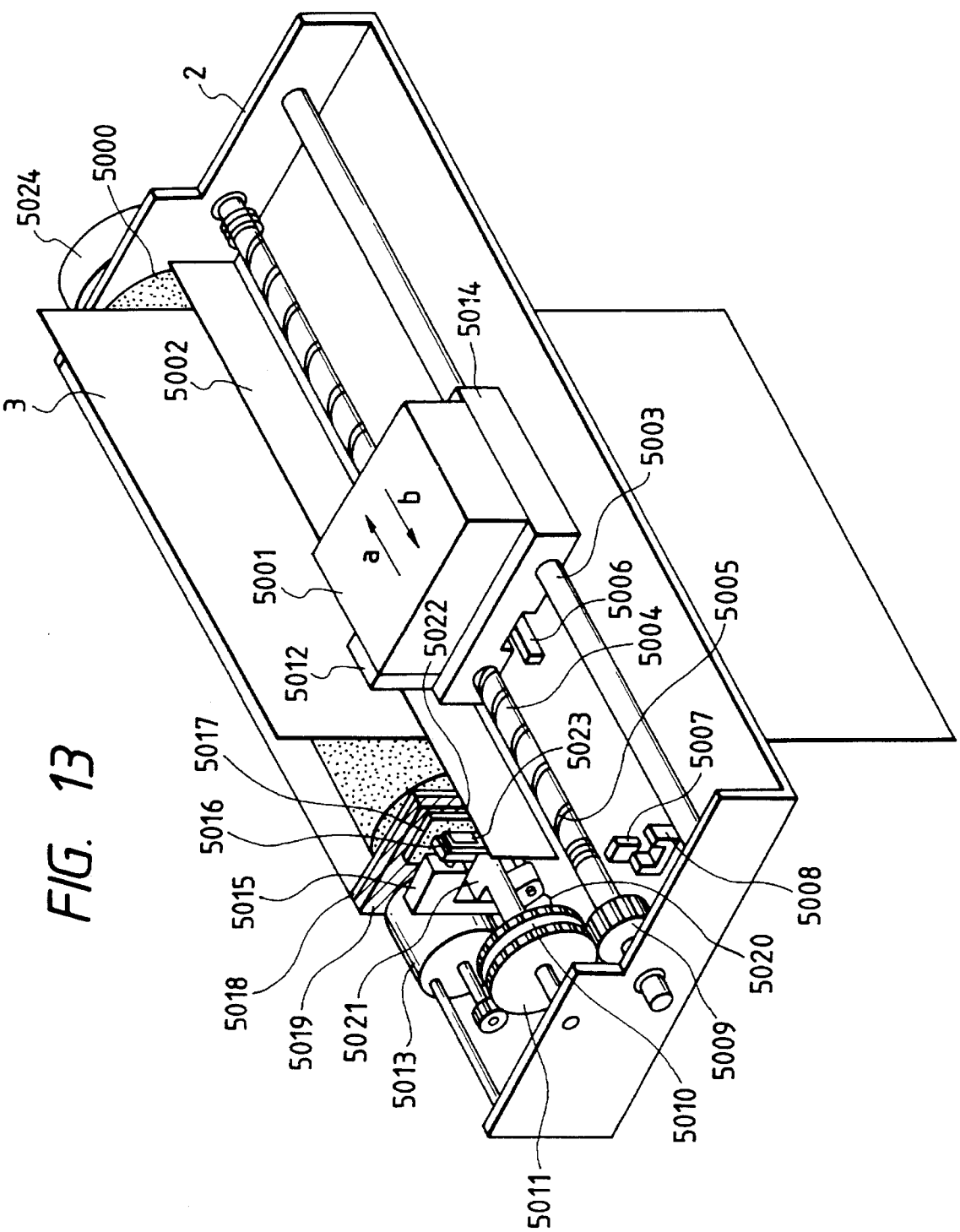
FIG. 13 is a perspective view showing a printer internal unit.

FIG. 13 is a perspective view for explaining the internal arrangement of the printer unit 2 using an ink-jet recording scheme in or to which the present invention is embodied or applied. Referring to FIG. 13, the printer unit 2 comprises an ink tank 5001 and a recording head 5012 connected to the ink tank 5001. The ink tank 5001 and the recording head 5012 constitute a replaceable integral cartridge. The cartridge is mounted on a carriage 5014. The carriage is driven by a guide 5003 in a subscanning direction.

A platen roller 5000 moves the recording paper 3 in the main scanning direction. The platen roller 5000 is rotated by a paper feed motor 5024 for rotating the platen roller 5000. A flexible cable (not shown) for supplying a head drive signal pulse and a temperature control current to the recording head 5012 is connected between the carriage 5014 and a printed circuit board (not shown) having an electrical circuit for controlling the printer.

The printer unit 2 having the above arrangement will be described in detail below. The carriage 5014 engages with a helical groove 5004 of a lead screw 5005 rotated through driving force transmission gears 5011 and 5009 interlocked with forward or reverse rotation of a drive motor 5013 having a pin (not shown) and is reciprocated in the directions indicated by arrows and A paper press plate 5002 presses the paper against the platen 5000 along the carriage movement direction. Photocouplers 5007 and 5008 serve as home position detecting means for detecting the presence of a lever 5006 of the carriage 5014 within the range defined by the photocouplers 5007 and 5008 to change the rotational direction of the motor 5013. A member 5016 supports a cap member 5022 for capping the front surface of the recording head. A suction means 5015 draws air from the cap to recover the recording head 5012 through an opening 5023 in the cap member 5022.

A cleaning blade 5017 is moved back and forth by a member 5019. The cleaning blade 5017 and the member 5019 are supported on a main body support plate 5018. A blade having the form described above need not be used, and another known cleaning blade can be applied to this embodiment. A lever 5021 for starting suction in suction recovery is moved together with movement of a cam 5020 engaged with the carriage 5014. A driving force from the drive motor is controlled by a known transmitting means such as a clutch switching mechanism.

When the drive motor 5013 is rotated from the home position of the carriage 5014 in the reverse direction, the power transmission gear 5011 is switched to a power transmission gear 5010 (although this switching is not illustrated), so that the driving force from the drive motor 5013 is transmitted to the lever 5021 through the cam 5020. Therefore, capping, cleaning, and suction recovery of the recording head 5012 are performed.

[Block Diagram of Printer]

Figure 3:
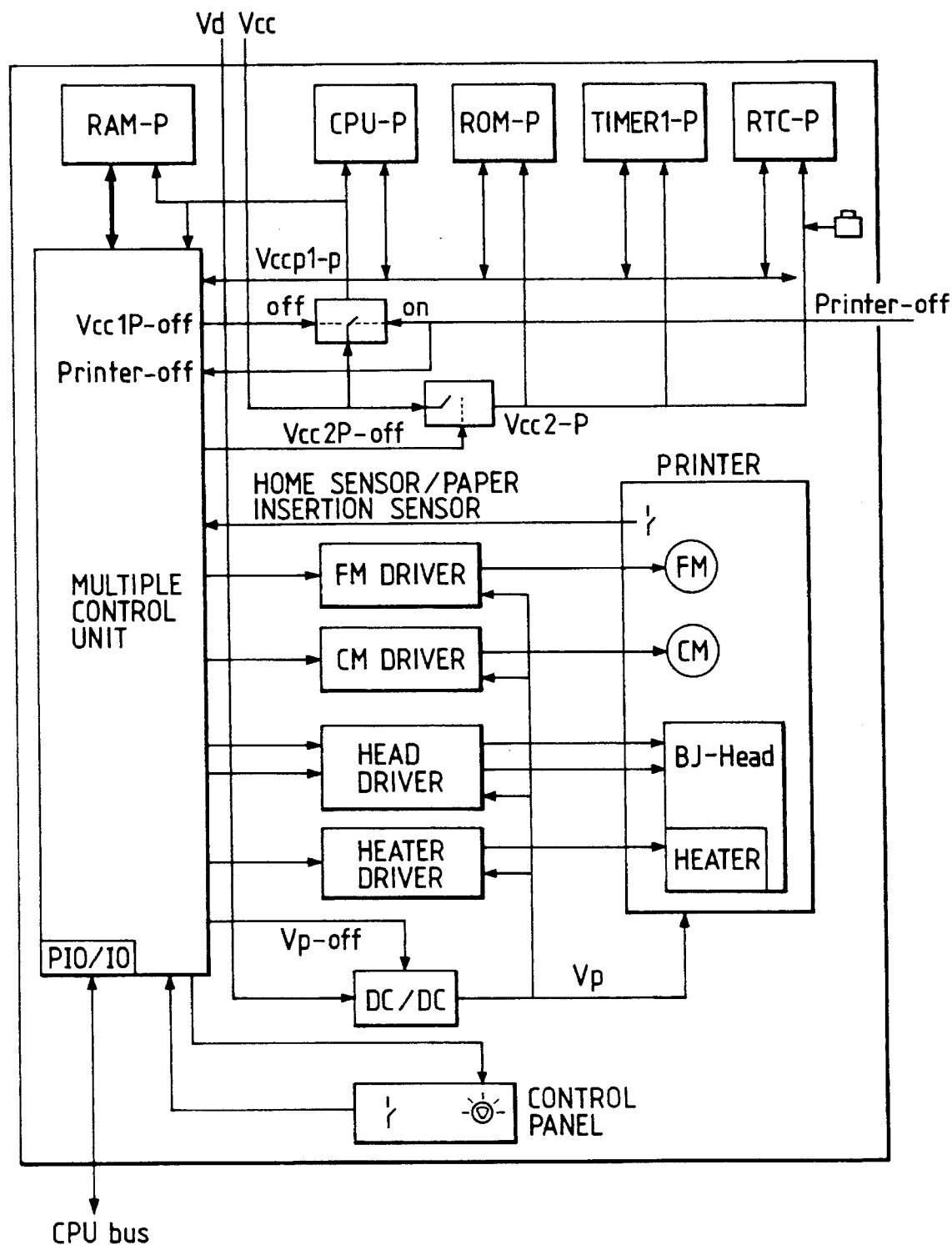
FIG. 3 is a block diagram of a printer I/F.

FIG. 3 is a block diagram showing an arrangement of a control system of the printer unit.

A CPU-P is a CPU in the form of a microprocessor for performing main control of the printer unit. The CPU-P performs desired processing on the basis of a printer command and data supplied from the host computer through a parallel IF (to be described later). A ROM-P is a ROM for storing programs corresponding to a recording control sequence and the like executed by the CPU-P, a character generator (CG), and any other permanent data. A RAM-P is a RAM which has a work area used as a register, a line buffer for storing one-line print data, a dot development buffer for storing the data developed into dots, and an input buffer from the parallel IF. A TIMER1-P is a timer for obtaining a drive phase time of a paper feed motor (FM), a heater, or the like. An RTC-P is an RTC for detecting a time lapse required for a recovery operation. A multiple control unit for integrally performing IF transfer control, power saving control, RAM access control, and printer port control is connected to the bus of the CPU-P. Printer drive control signals are output from the multiple control unit and are converted into FM, CM, BJ-Head, and heater drive levels by an FM driver, a CM driver, a head driver, and a heater driver, respectively. The energy saving signals are a Vcc1P-off, Vcc2P-off, and Vp-off power control signals from the multiple control unit, and input signals are a Printer-off signal, printer sensor signals, and control panel signals. Of these signals, the Vcc1-P power supply is performed only when the Printer-off signal is changed from an active level to an inactive level, and power is supplied only to the multiple control unit, the CPU-P, and the RAM-P. The Vcc1P-off signal can disconnect the Vcc1P power when the Printer-off signal is changed to OFF in accordance with the printer drive state. That is, the head is not powered off in a open cap state, and a decisive failure can be prevented.

Figure 6:
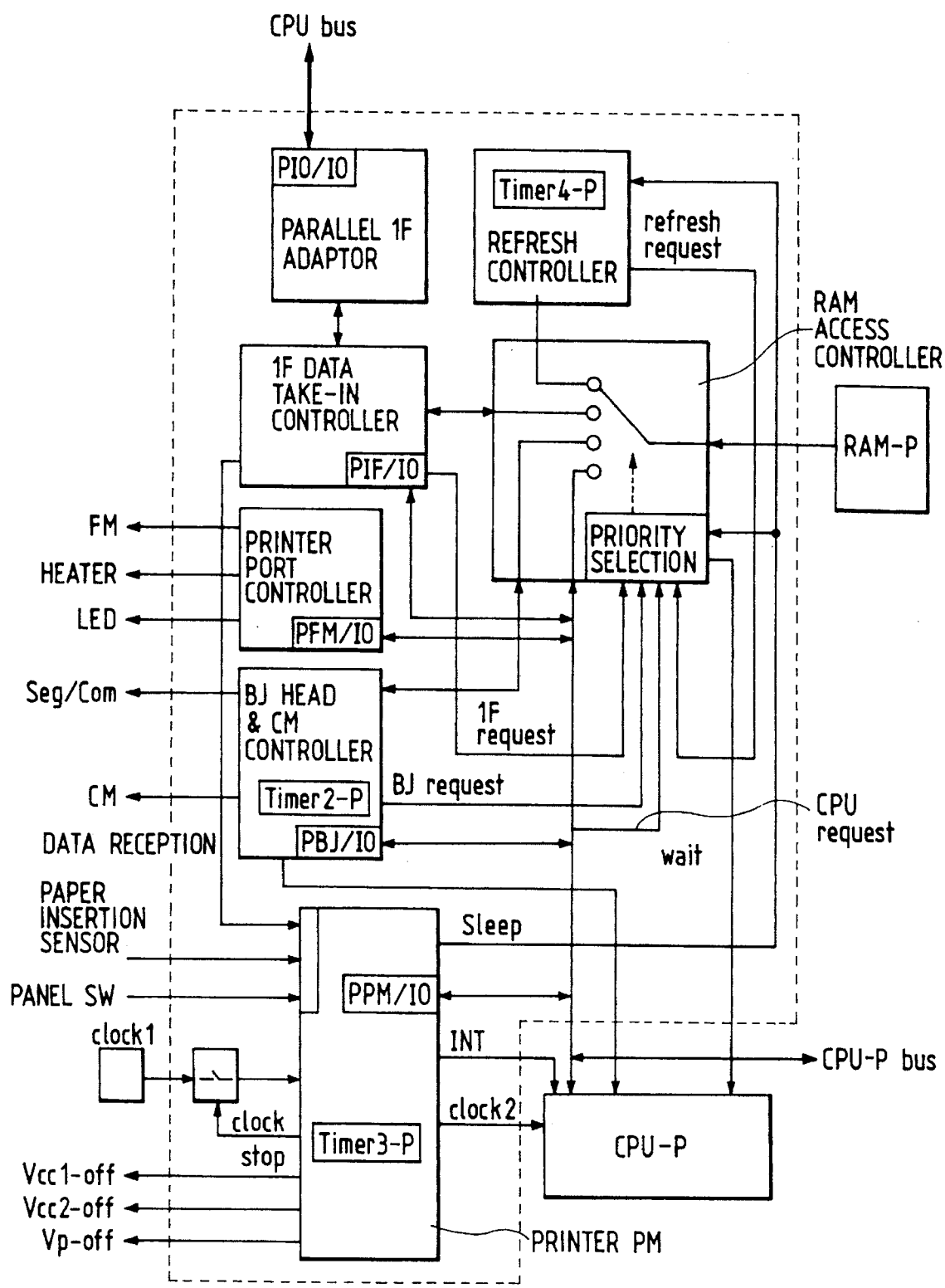
FIG. 6 is a block diagram showing an internal arrangement of a multiple control unit.

FIG. 6 is a block diagram showing an arrangement of the multiple control unit. The functional blocks of this arrangement are a parallel IF adapter mainly serving as a host IF adapter, an IF data take-in controller for storing parallel data in the input buffer (IB) of the RAM-P through the parallel IF adapter, a refresh controller for generating a refresh timing for the RAM-P, a BJ head & CM controller for reading out one-line dot development data (PB) in the RAM-P and controlling phase excitation of the carrier while a BJ head is driven to perform printing, a printer port controller for driving the FM driver, the heater driver, and an LED driver, a RAM access controller having access rights in a priority order for four access requests, i.e., access requests of the IF data take-in controller, the refresh controller, the BJ head & CM controller, and the CPU-P, and a printer PM controller for performing power saving control. An interrupt signal INT is used for a hardware interrupt shown in FIG. 22. The signal INT is generated on the basis of a signal from the IF data take-in controller, the paper insertion sensor, or the panel SW and is input to the CPU-P. This is the hardware interrupt shown in FIG. 22.

Figure 7:
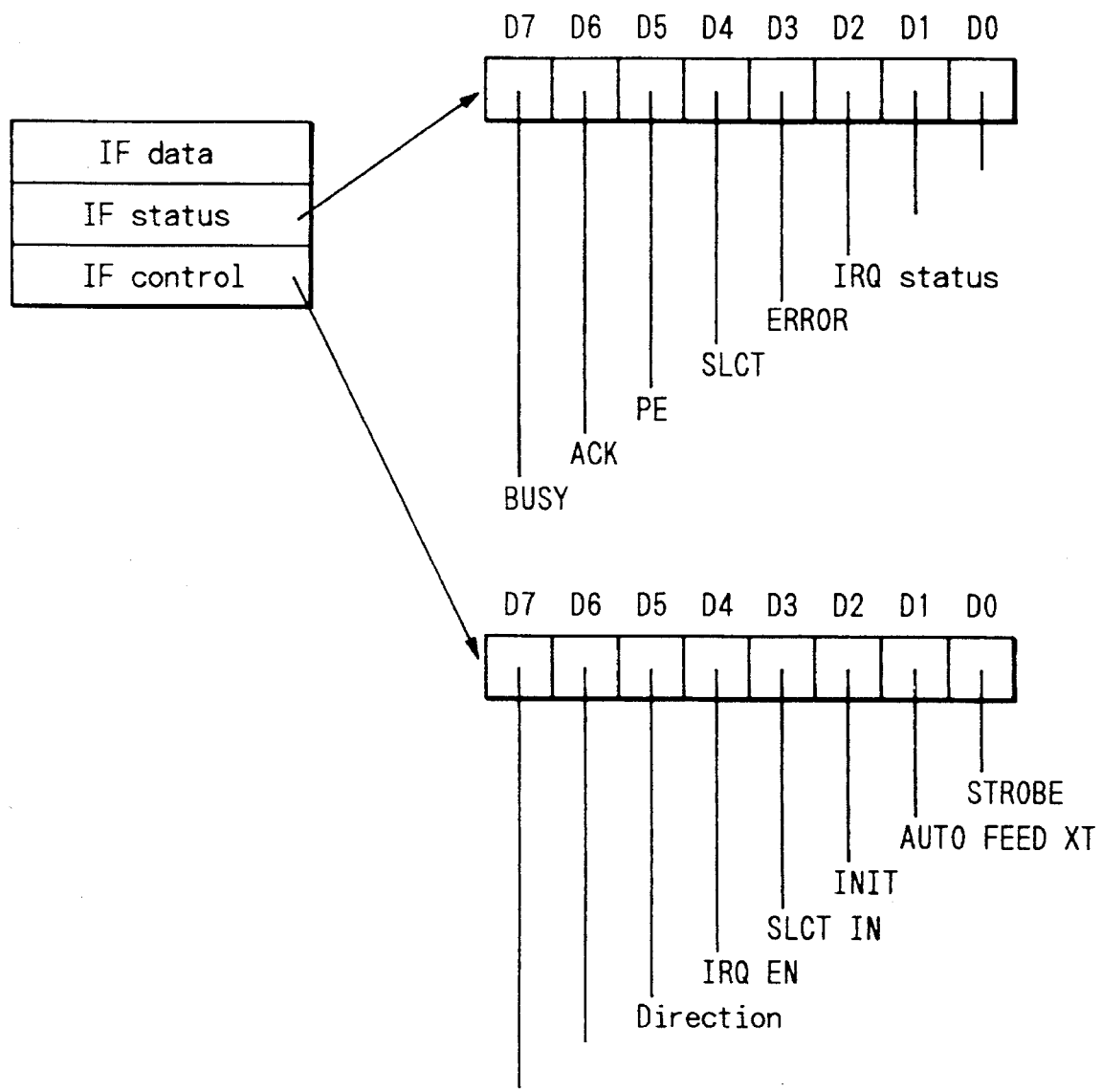
FIG. 7 is a view showing an arrangement of a PIO/IO register.

FIG. 7 shows an arrangement of an I/O register (PIO/IO) in the parallel IF adapter when viewed from the host. This I/O register consists of an IF send data register, an IF receive data register, an IF status register, a Buffer SP register, and an IF control register.

Figure 8:
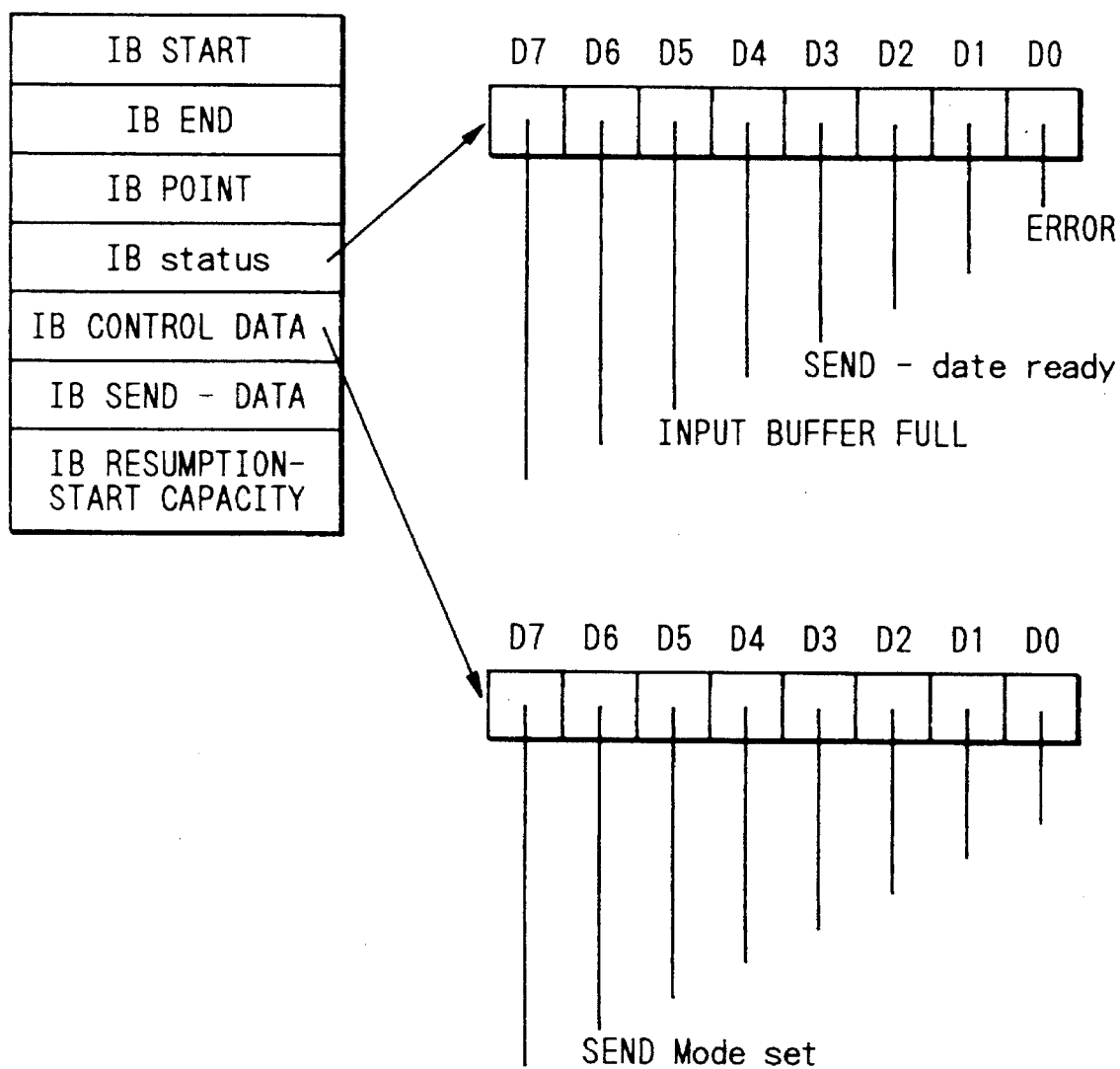
FIG. 8 is a view showing an arrangement of a PIF/IO register.

FIG. 8 shows an arrangement of an I/O register (PIF/IO) in the IF data take-in controller when viewed from the printer. The I/O register includes IB start, IB end, IB POINT, IB status, IB control data, and IB send data registers.

Figure 9:
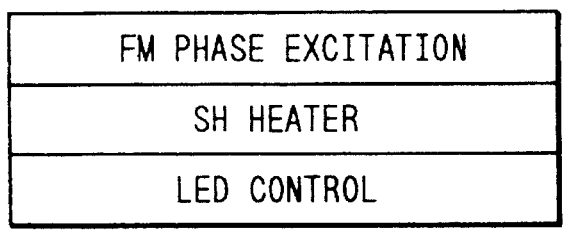
FIG. 9 is a view showing an arrangement of a PFM/IO register.

FIG. 9 shows an arrangement of an I/O register (PFM/IO) in the printer port controller when viewed from the printer. The I/O register consists of an FM phase excitation, SH heater signal, and LED control registers.

Figure 10:
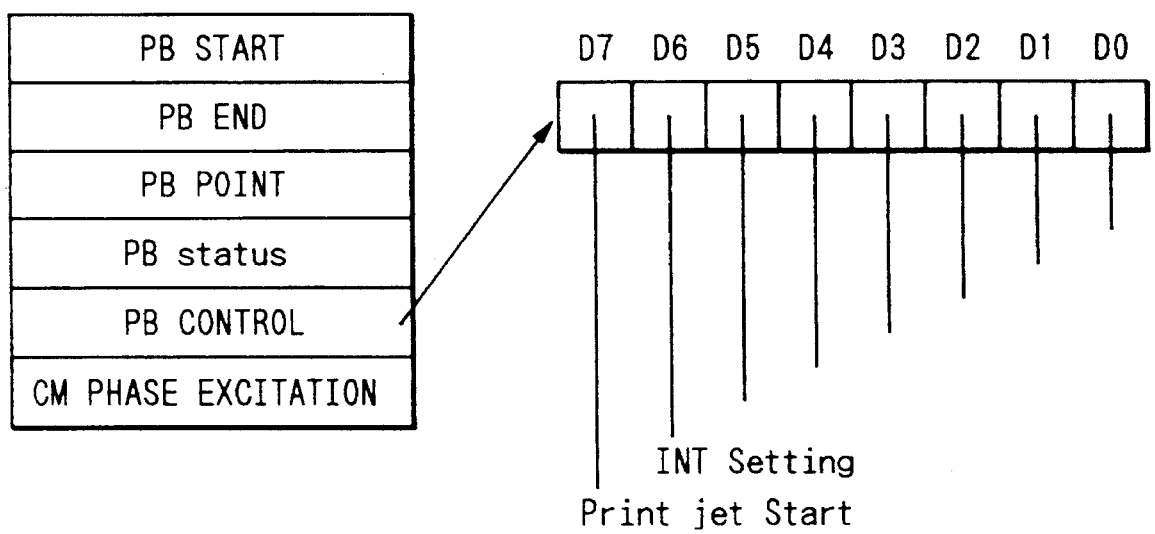
FIG. 10 is a view showing an arrangement of a PBJ/IO register.

FIG. 10 shows an arrangement of an I/O register (PBJ/IO) in the BJ head & CM controller when viewed from the printer. The I/O register consists of PB start, PB end, PB POINT, PB status, PB control data, and CM phase excitation registers.

Figure 11:
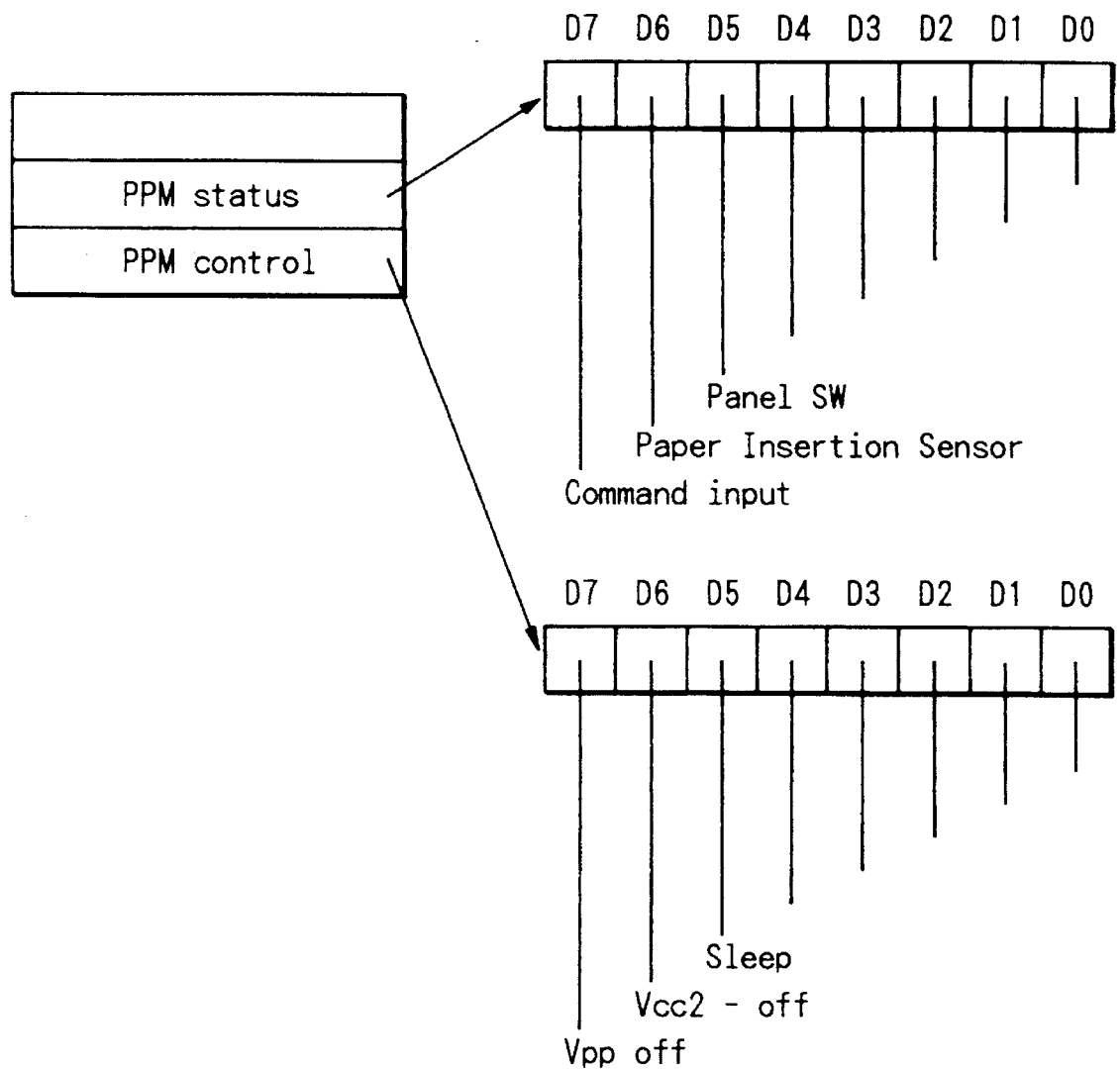
FIG. 11 is a view showing an arrangement of a PPM/IO register.

FIG. 11 shows an I/O register (PFM/IO) in the printer PM controller when viewed from the printer. The I/O register consists of PPM status and PPM control data registers.

Figure 12:
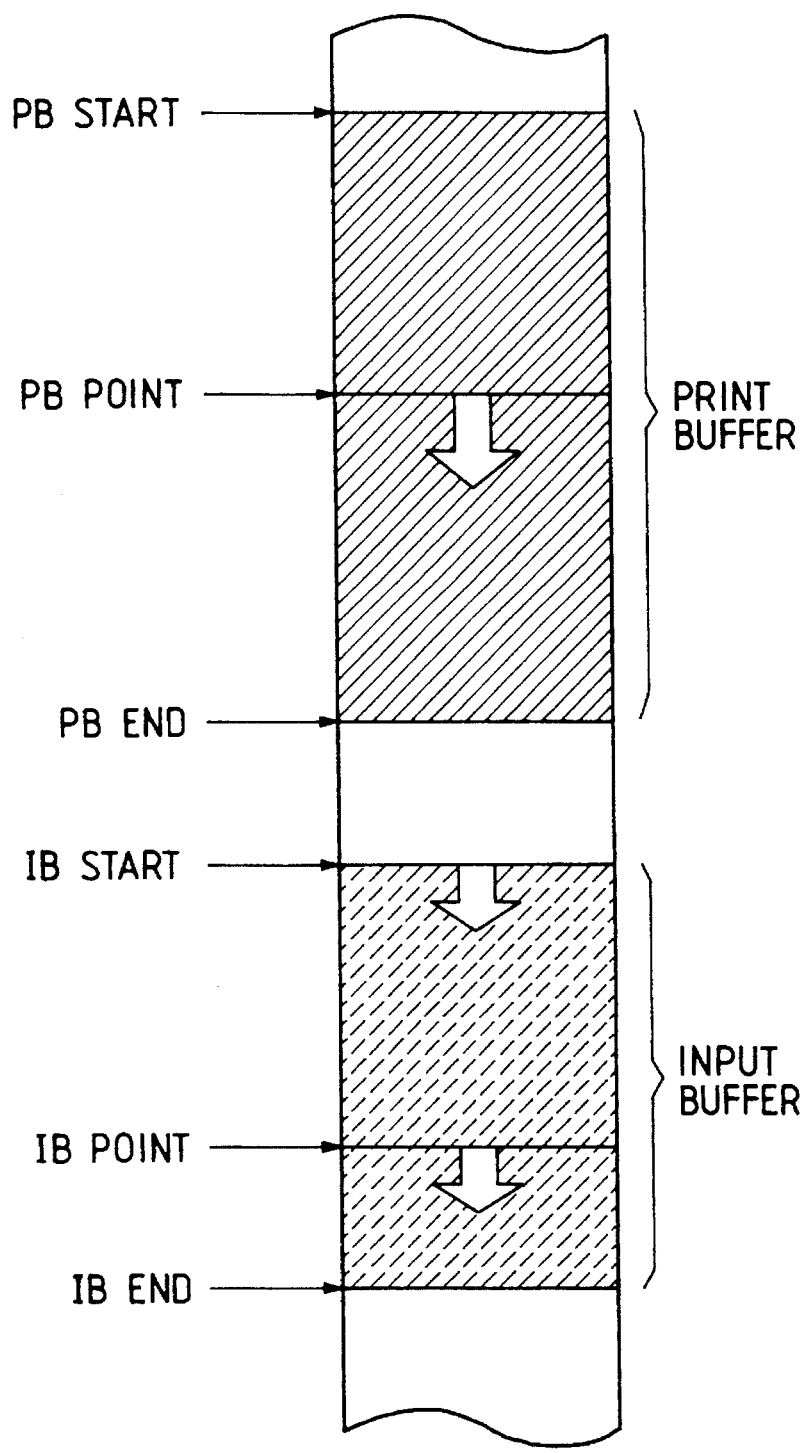
FIG. 12 is a view showing a PB (Printer Buffer) and IB (Input Buffer) address areas of a printer RAM-P.

FIG. 12 shows address area allocation in the RAM-P of FIG. 3, representing a print buffer (PB) for controlling the BJ head & CM controller and a reception buffer (IB) for controlling the IF data take-in controller.

The print buffer area is used to set a data area required for data printing. A start address (PB START) and an end address (PB END) of the print buffer area are set to sequentially read out the storage data from the start address within the range of the buffer area under the control of the BJ head & CM controller. The storage data is read out up to the end address from the RAM-P and a control signal is supplied to the head driver. At this time, a print data address pointer (PB pointer) represents a data address of currently sent data.

The reception data buffer (equivalent to an INPUT BUFFER to be described later) area is used to set a data area required for data reception. A start address (IB START) and an end address (IB END) of the reception data buffer are set. Storage data are sequentially read out from the start address within the designated range under the control of the IF data take-in controller. The storage data are read out from the RAM-P up to the end address, thereby sending a control signal to the head driver. At this time, a reception data address pointer (IB pointer) represents a data address of the currently received data.

Figure 14:
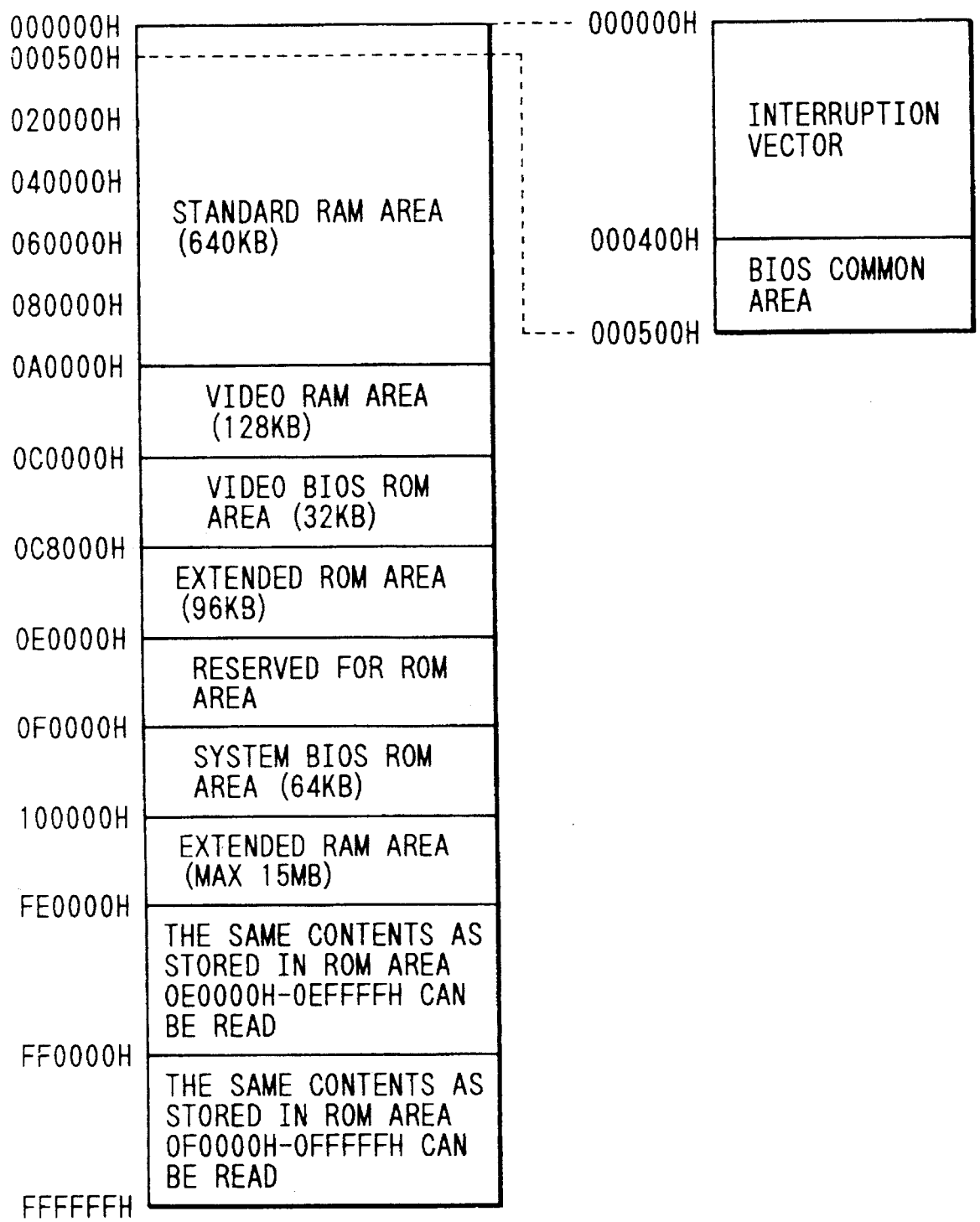
FIG. 14 is a memory space address map of the host.

FIG. 14 shows a detailed arrangement of a memory map of the host RAM in FIG. 2. The RAM has a standard area having addresses 0000h to A0000h and an extended area having addresses 10000h to FE0000h. The standard area has a 640-KB capacity, and the extended area has a 15-MB capacity. The RAM is mapped to have these areas.

A start portion of the standard RAM area which has addresses 00000h to 000400h is allocated as an area for storing an interruption vector. This area stores entry addresses of the respective processing operations for this interrupt.

A video RAM area and a video BIOS ROM area in FIG. 14 are allocated in the LCDC of FIG. 2. A video control program is stored in the video BIOS ROM area. Video display data is held in the video RAM area.

An area having addresses C8000h to E0000h serves as an extended ROM area. This area serves as a ROM area used by an extension port and the like.

An area having addresses F0000h to 10000h is allocated in the ROM BIOS area and stores a BIOS program for performing various I/O processing operations.

FIG. 15 shows an address map of each I/O. Data can be exchanged between the respective hardware arrangements by the read and write operations with respect to the address ports set in the respective hardware arrangements. A keyboard will be taken as an example. Data is are exchanged between the memory and the keyboard controller through ports allocated at the addresses 60h to 64h. The data reception port is read-accessed to receive data from the keyboard.

Similar processing operations are performed for other addresses.

Areas represented by parallel Centronics 1 to parallel Centronics 3 represent interface areas which are common in the I/O space to the printer interface area.

FIGS. 16 and 17 show contents of the interruption vector in FIG. 14 in detail. An area having addresses 0h to Fh is allocated as a hardware interrupt area, and an area from address 10h is located to a software interrupt.

A program at an address registered in each entry is executed in response to the corresponding interrupt. Addresses for a ROM BIOS program and a program stored in the RAM are set in the entries. When a hardware or software interrupt is generated, the corresponding processing is executed, and the respective operations are performed.

Each processing after a power-ON operation will be described below.

Figure 18:
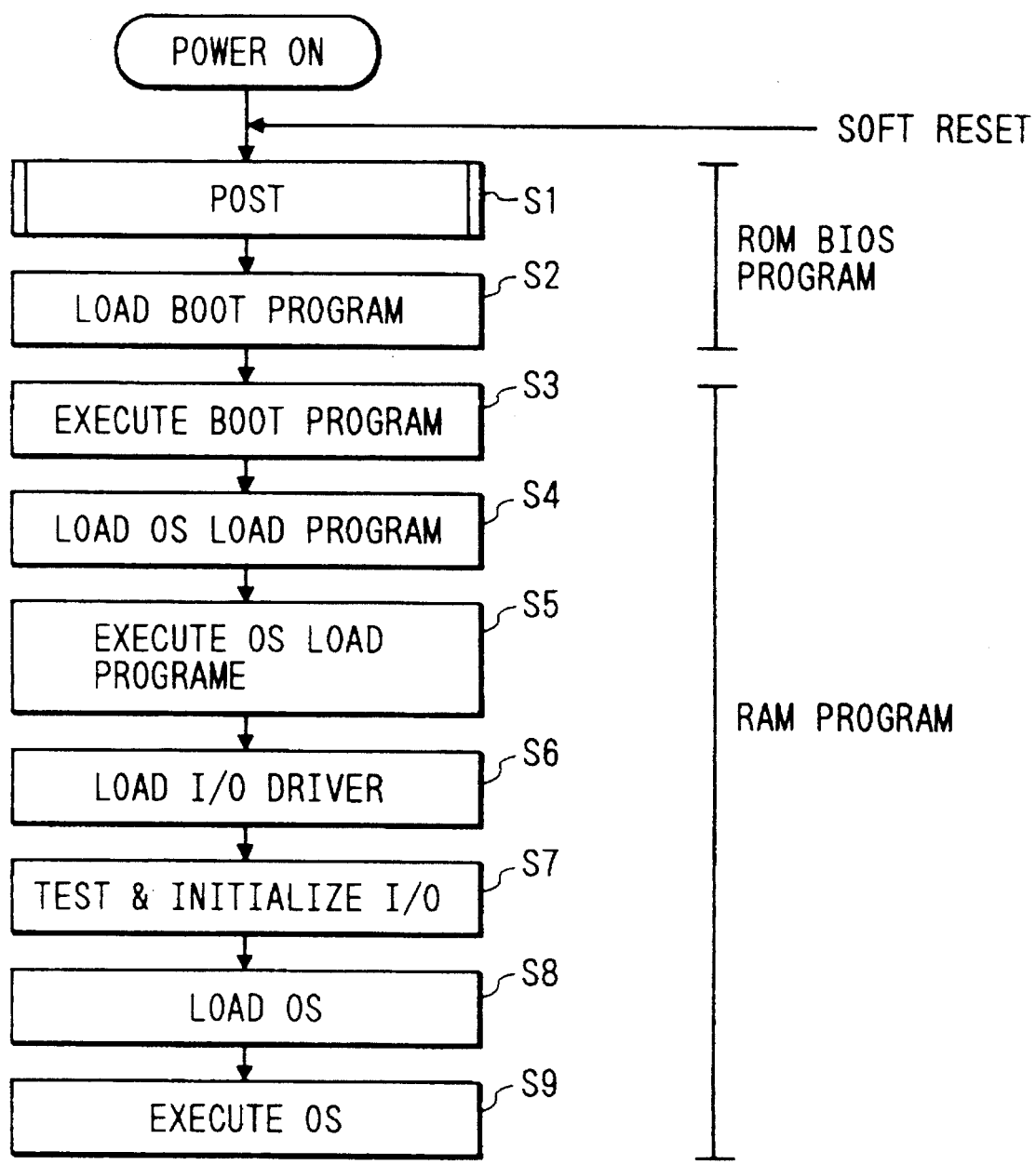
FIG. 18 is a flow chart of a power-ON operation.

In the flow chart of the power-ON operation in FIG. 18, the flow advances to step S1. Soft reset processing by the keyboard is also executed in step S1 upon the power-ON operation. In step S1, POST processing is performed. The POST processing is power on self-test processing to test and initialize each hardware arrangement. The flow advances to step S2 to load a boot program for starting a system program. The boot program is stored in an FD (floppy disc) or HD (hard disc) and is located at, e.g., track 0 and sector 0. The contents at track 0 and sector 0 are taken into a memory to load the boot program. Steps S1 and S2 are performed within the ROM BIOS. The flow advances to step S3 to execute the loaded boot program. The boot program is a program for loading a program for loading an OS program from the FD or HD. The flow advances to step S4 to load the OS load program. The flow advances to step S5 to execute the OS load program. The OS load program is a program for loading the OS in the memory. In step S6, an I/O driver is loaded. The I/O driver is a program for controlling an I/O. The OS can exchange data with each I/O by means of the I/O driver. The flow advances to step S7 to test and initialize the I/O. The flow advances to step S8 to load the OS in the memory. Up to this step, preparation for executing the OS is completed. The flow advances to step S9 to execute the OS. The OS processes inputs from the keyboard and displays various messages on the display unit to perform data exchange with the operator. The OS executes various commands in accordance with various command inputs by the operator.

Figure 19:
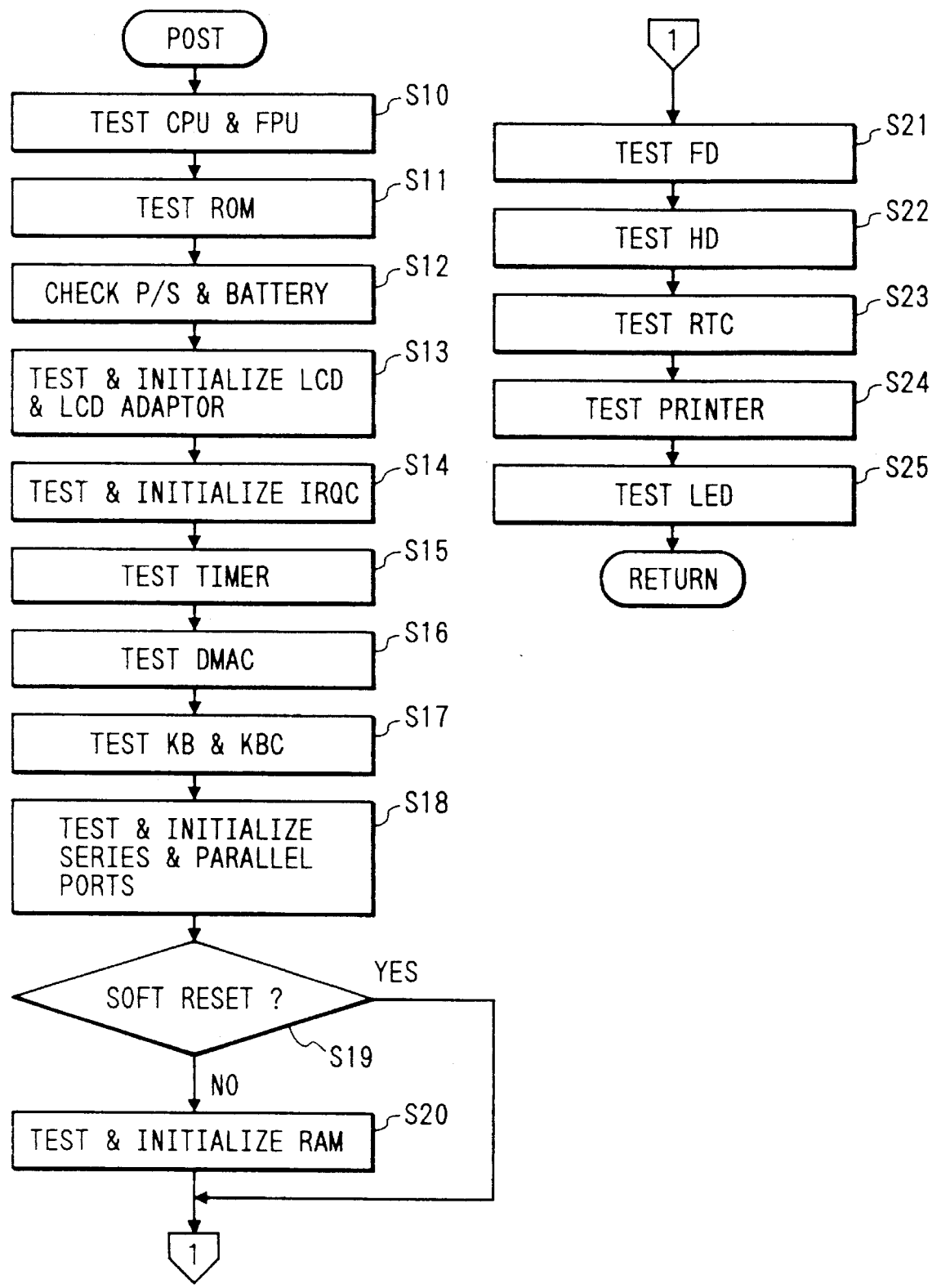
FIG. 19 is a flow chart of a POST (Power On Self-Test)

FIG. 19 is a flow chart for explaining the POST processing in step S1 of FIG. 18 in detail. The FPU (numerical operation processor) shown in FIG. 2 is tested (step S10). The ROM is tested (step S11). The power source (P/S) and the battery are checked (step S12). The LCD and the LCD adapter are tested and initialized. The LCD adapter includes the RAM and ROM, so that the RAM and ROM are also checked (step S13). An interrupt controller (IRQC) is tested and initialized (step S14). A timer is then tested (step S15). The DMA controller is tested (step S16). The keyboard (KB) and the keyboard controller (KBC) are tested (step S17). The serial and parallel ports are tested and initialized (step S18). It is then checked if soft reset is made (step S19). If YES in step S19, the test and initialization of the RAM in step S20 are skipped, and the flow advances to step S21. If soft resetting is not detected, the flow advances to step S20, and the test and initialization of the RAM are performed. The FD test is then performed (step S21). The HD is tested (step S22). The real-time clock (RTC) is tested (step S23). The printer is tested. In this case, the printer is tested to check various printer ports and a printer connection (step S24). The LED is then tested (step S25). The flow then returns to the main routine in FIG. 18. By the above processing operations, the POST processing in step S1 in FIG. 18 are completed. If errors occur in devices, error messages are displayed.

Figure 20:
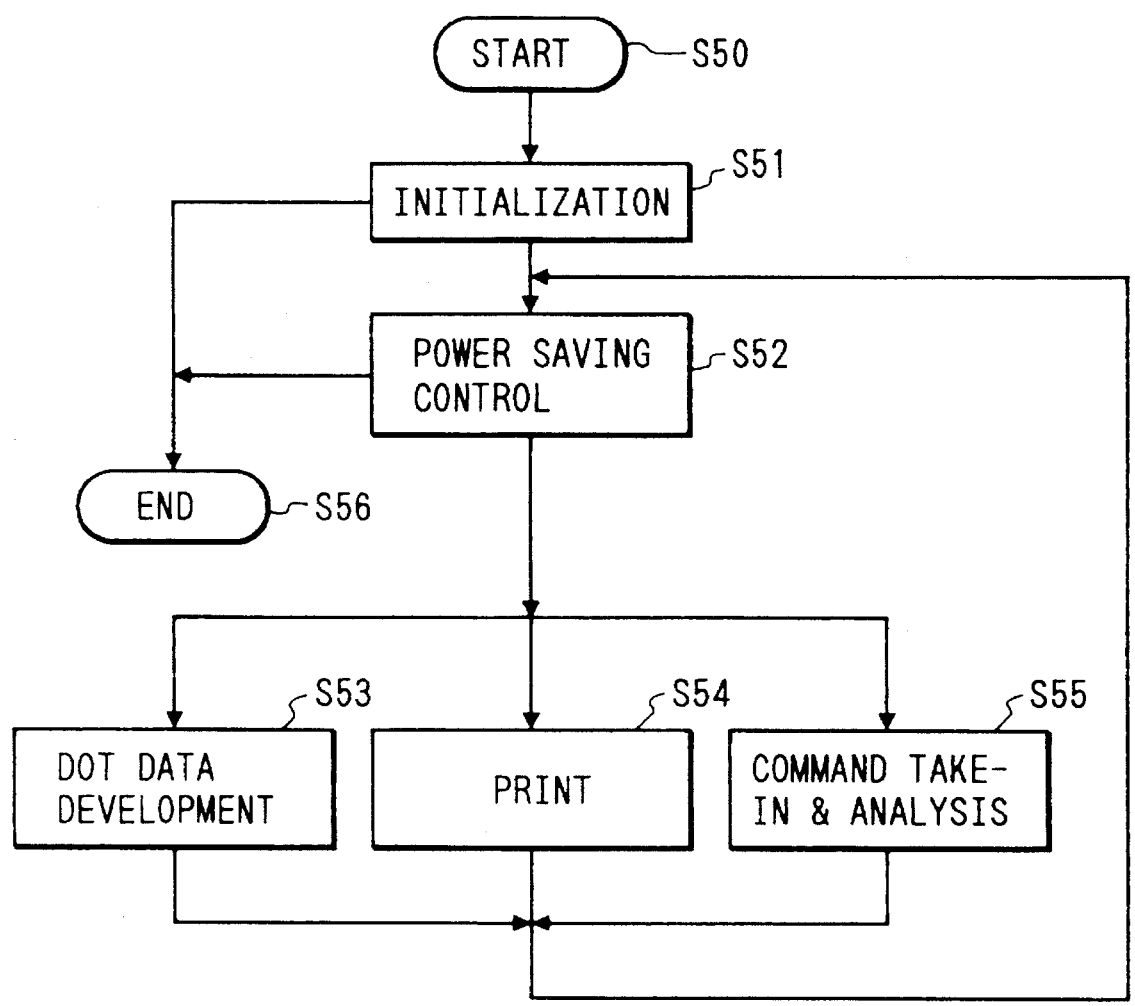
FIG. 20 is a control flow chart of a printer CPU-P.

FIG. 20 is a flow chart of printer soft control.

Initialization is performed in step S51. If a Printer-off signal is sent from the host to the printer, the flow is ended in step S56. However, if the Printer-off signal is not sent from the host to the printer, the flow advances to step S52. In power saving control in step S52, if a Printer-off signal is set from the host to the printer, the flow is ended in step S56. However, if the Printer-off signal is not set from the host to the printer, parallel processing in steps S53, S54, and S55 is executed. More specifically, step S53 executes dot data development processing for developing character code data in the line buffer into one-line dot data. Step S54 executes a series of print processing operations performed when the dot data of the next line is ready and a print start command of this line is executed or when a sequential execution command is executed. Step S55 executes a command take-in analysis for interpreting a command and data which are taken into the input buffer and forming a line buffer. When the processing operations in steps S53, S54, and S55 are completed, the flow returns to power saving control processing in step S52.

Figure 21:
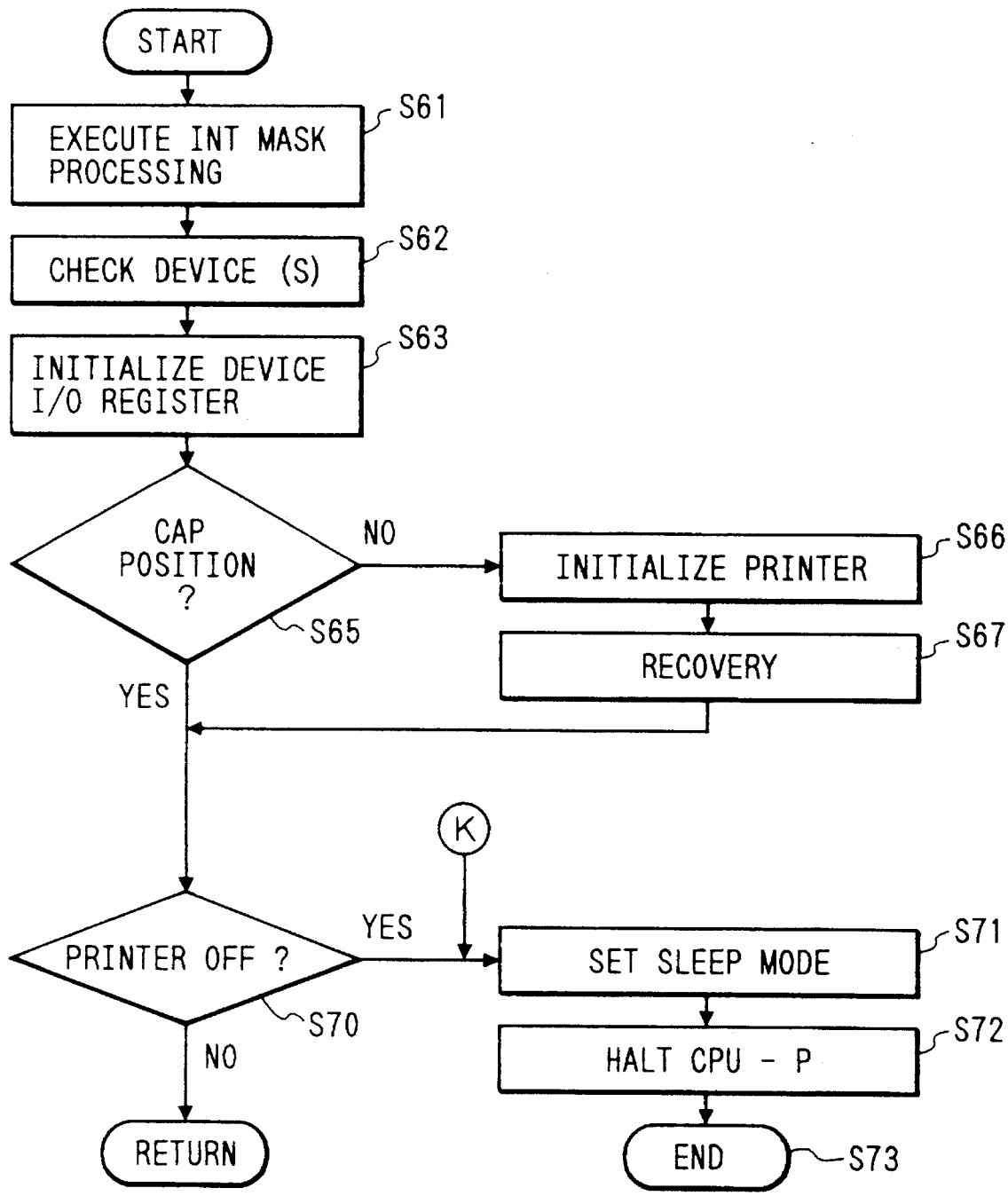
FIG. 21 is a control flow chart of initialization of the printer CPU-P.

FIG. 21 is a detail flow chart of initialization in FIG. 20.

Interrupt (Int) mask processing is performed in step S61, and the flow advances to step S62. In step S62, devices such as the ROM-P, the RAM-P, and the TIMER-P are checked. The flow then advances to step S63. In step S63, the device I/O register for setting the above-mentioned registers (PIF/IO, PFM/IO, and PPM/IO) in desired set conditions is initialized. The flow then advances to step S65 to check if the printer is set in a cap position. If YES in step S65, the flow advances to step S70. However, if NO in step S65, printer initialization processing for performing mechanical positioning of the printer and subsequent recovery processing for capping the head after recover suction is repeatedly performed until an ink is discharged are performed in step S66, and the flow advances to step S70. It is checked in step S70 if a Printer-off signal is present in the printer. If YES in step S70, a series of operations in steps S71, S72, and S73 are performed as CPU-P procedures which serve as transition procedures to a Sleep Mode to be described below. The Sleep Mode is set in the PPM/IO register, and the CPU-P is set in the Halt Mode. However, if NO in step S70, the flow returns to the main flow.

Figure 23:
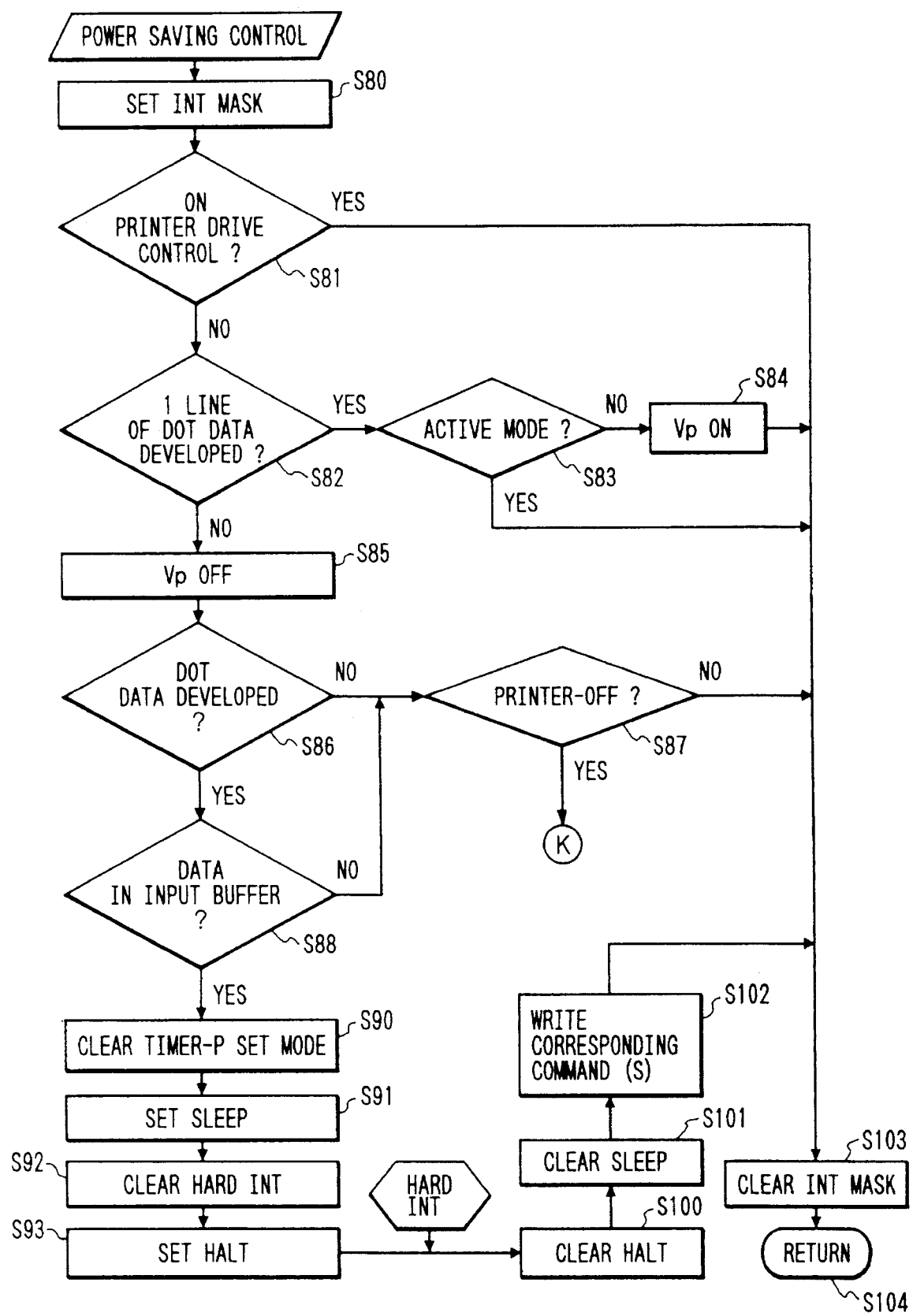
FIG. 23 is a control flow chart of power saving control of the printer CPU-P.

FIG. 23 is a detailed flow chart of power saving control processing in FIG. 20.

Interrupt mask (INT MASK) processing is performed in step S80, and the flow advances to step S81. It is checked in step S81 if printer drive control is ON. If YES in step S81, the interrupt mask is cleared in step S103, and the flow returns to the main flow. However, if NO in step S81, the flow advances to step S82 to check if one line of dot data is developed. If one-line dot data development is completed, the flow advances to step S83 to check if the printer is currently set in an Active Mode. If YES in step S83, the flow advances to step S103. However, if NO in step S83, the flow advances to step S84 to turn on a printer drive power source Vp, and the flow advances to step S103. However, if NO in step S82, i.e., when one-line dot data development has not yet been completed, the flow advances to step S85. In step S85, the power source Vp is turned off, and the flow advances to step S86 to check if the dot data is developed. If YES in step S86, the flow advances to step S88. Otherwise, the flow advances to step S87 to check if a Printer-off signal is detected. If YES in step S87, the flow advances to step S71 in FIG. 21, and END processing in steps S71 and S72 is performed. However, if NO in step S87, the flow advances to step S103. It is checked in step S88 if data is present in the input buffer. If NO in step S88, the flow advances to step S87. However, if YES in step S88, the TIMER-P Set Mode is cleared in step S90. The subsequent steps S91, S92, and S93 are procedures performed expecting the next external hardware interrupt. After the Sleep Mode is set, the hard interrupt is cleared, and a Halt Mode is set. When a hard interrupt is detected in the state of step S93, operations correspond to steps S100, S101, and S102, so that the Halt Mode is cleared. The Sleep Mode is cleared, and Ready Mode resumption processing such as writing of a command corresponding to the hard interrupt is performed. The flow then advances to step S103.

Figure 22:
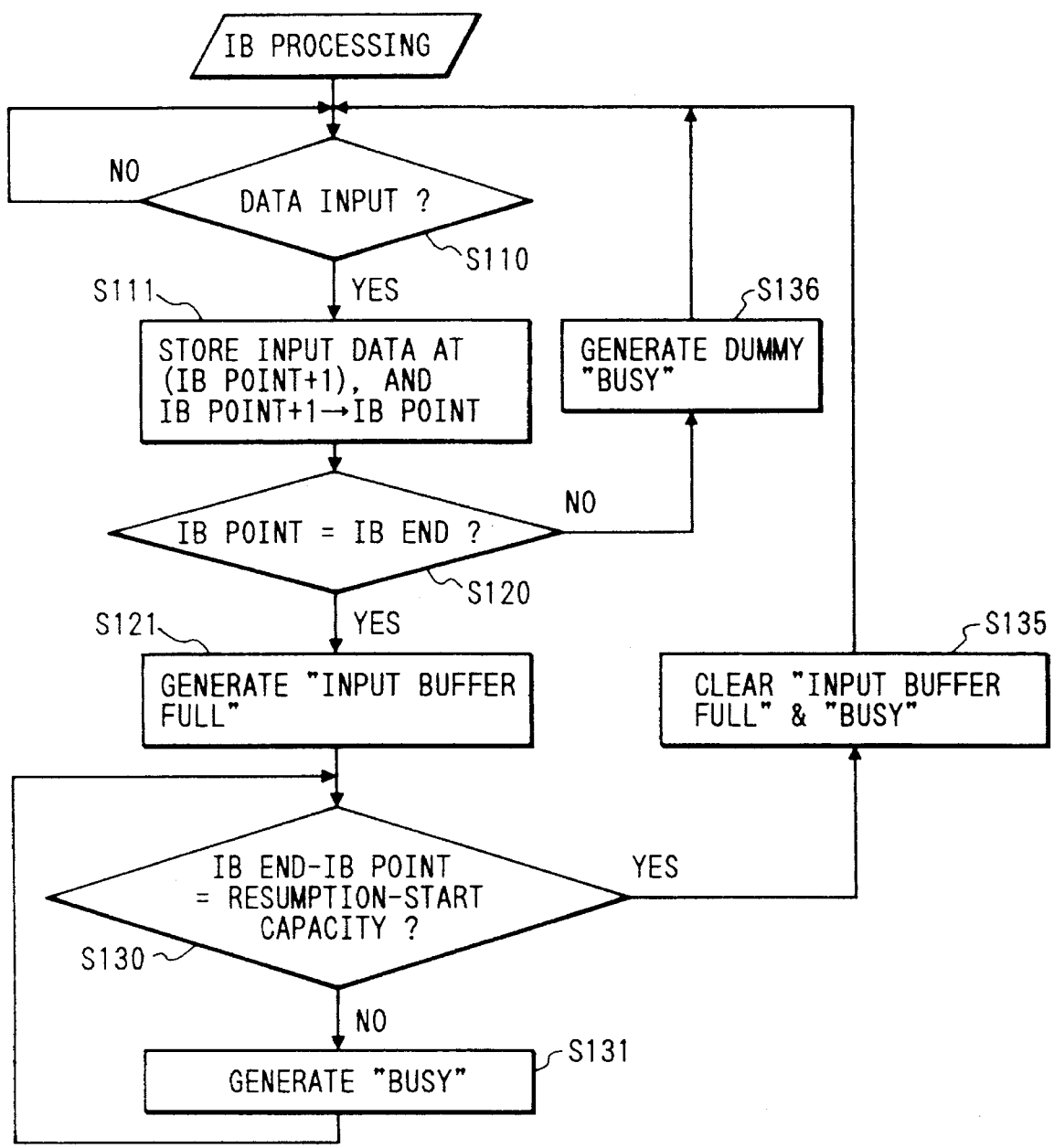
FIG. 22 is a flow chart showing changes in a printer PM controller.

FIG. 22 is a chart showing transition of states of the printer PM controller in accordance with conditions.

After the RESET is performed, the printer PM controller is set in a state A. When the Sleep Mode is set in the PMM/IO register, the printer PM controller is changed to a state B. The only change in state A is a change from state A to state B by sleep setting of the CPU-P. Changes in state B are two changes, i.e., a change to state A upon occurrence of paper insertion, an operation SW input, a data input, or the like, and a change to state C by the Printer-off signal from the host.

Figure 24:
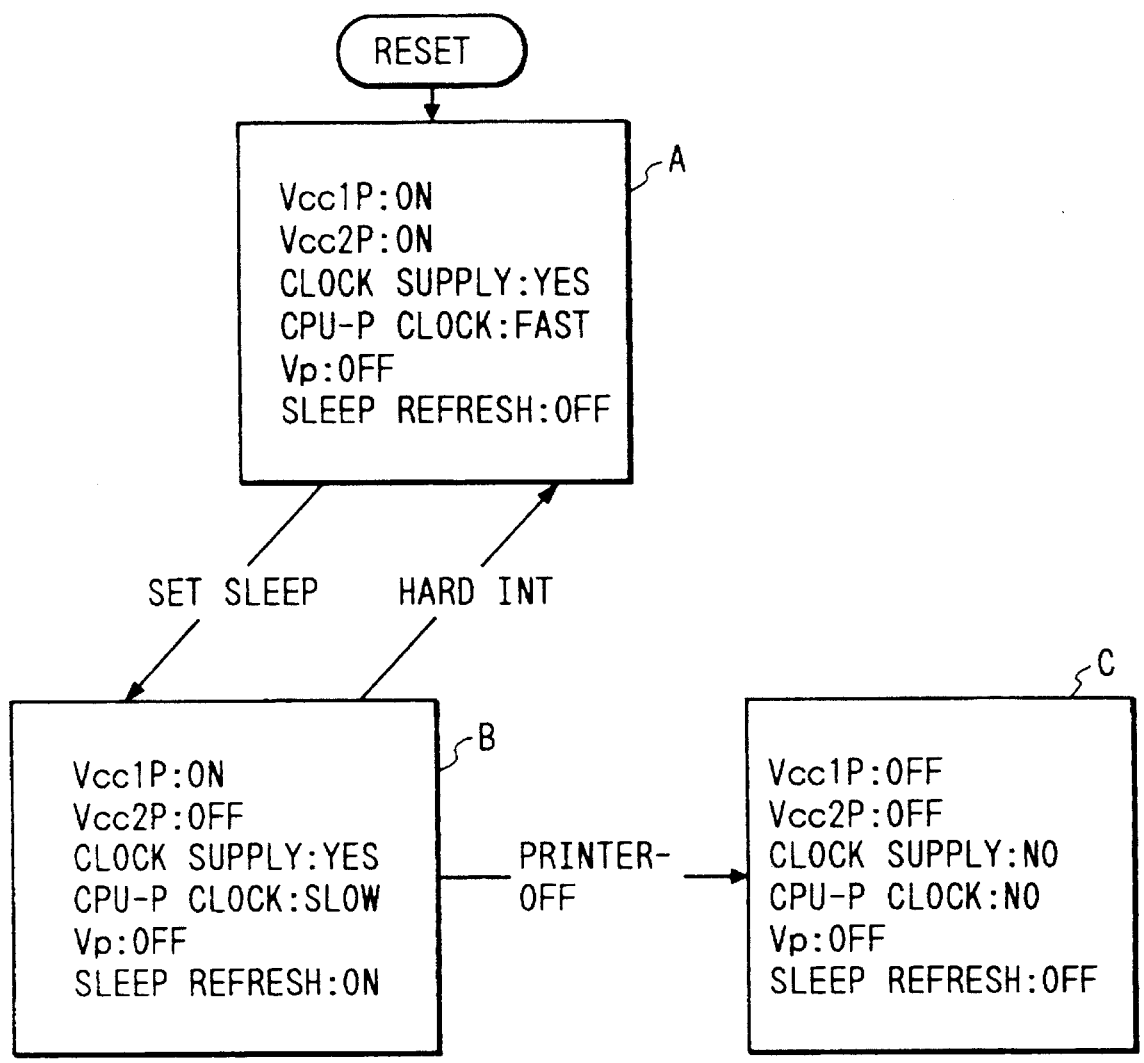
FIG. 24 is a flow chart showing changes in states of a printer system.

FIG. 24 is a chart showing transition in the overall printer system.

There are four states, i.e., a Stop Mode in which all clocks are absent and no power supply is made, an Active Mode in which all the power sources and clocks are normal and a print ready state is set, a Ready Mode without any printer drive power supply as compared with the Active Mode, and a Sleep Mode in which Vcc power supply is made to only the CPU-P, the controllers, and the RAM-P, the CPU-P and the RAM-P are basically inoperative, and the contents of the memories and registers are at least held.

Change systems of the respective modes, CPU-P control, and the change systems of the controllers will be correspondingly described below.

In the RESET state, the Ready Mode is set. This can be realized by using a change system of RESET→A in FIG. 23.

In the Ready Mode, the first change system from the Ready Mode is a system of Ready Mode→Active Mode, which is controlled by the CPU-P in step S84 in FIG. 23. The second change system from the Ready Mode is a system of Ready Mode→Sleep Mode, in which when data to be processed is absent in an end-of-print state in a series of CPU-P operations in steps S81 to S93 in FIG. 23, the "Sleep" is set in the controller to obtain a Halt state, and the change from state A to state B (FIG. 23) occurs in the controller by Sleep setting. In the Active Mode, only one change system from the Active Mode, i.e., a system of Active Mode→Ready Mode, which is controlled by the CPU-P in step S85 in FIG. 23, is available.

In the Sleep Mode, the first change system from the Sleep Mode is a system of Sleep Mode→Ready Mode, in which a change in state from state B in state A in FIG. 23 occurs by paper insertion, an operation SW input, a data input or the like. At the same time, a hardware interrupt is input to the CPU-P, and the CPU-P restores the initial state by steps S100 to S103 in FIG. 23. The second change system from the Sleep Mode is a system of Sleep Mode→Stop Mode in accordance with a condition using the Printer-off signal. This second change system causes a change in state from state B to state C in FIG. 23 in the controller and does not require CPU-P control.

When data exchange does not occur, since the Sleep Mode is set, power saving can be achieved. In addition, even if high-speed transfer such as block transfer occurs, the start of data transfer can be immediately restored to receive data since the Sleep Mode is set.

The present invention exemplifies the embodiment describing an ink-jet recording scheme, but is not limited as to the types of printers and the types of recording schemes, as a matter of course.

In addition, the present invention exemplifies an integral arrangement including a personal computer and a printer. However, the present invention is also applicable to a personal computer and a printer separated from the personal computer but having the same battery drive source as that of the personal computer.

In addition, when a printer has a separate battery drive source, a system of Ready Mode→Stop Mode by the Printer-off signal need not be used, and the resultant apparatus can be realized in the form excluding this system.

Figure 26:
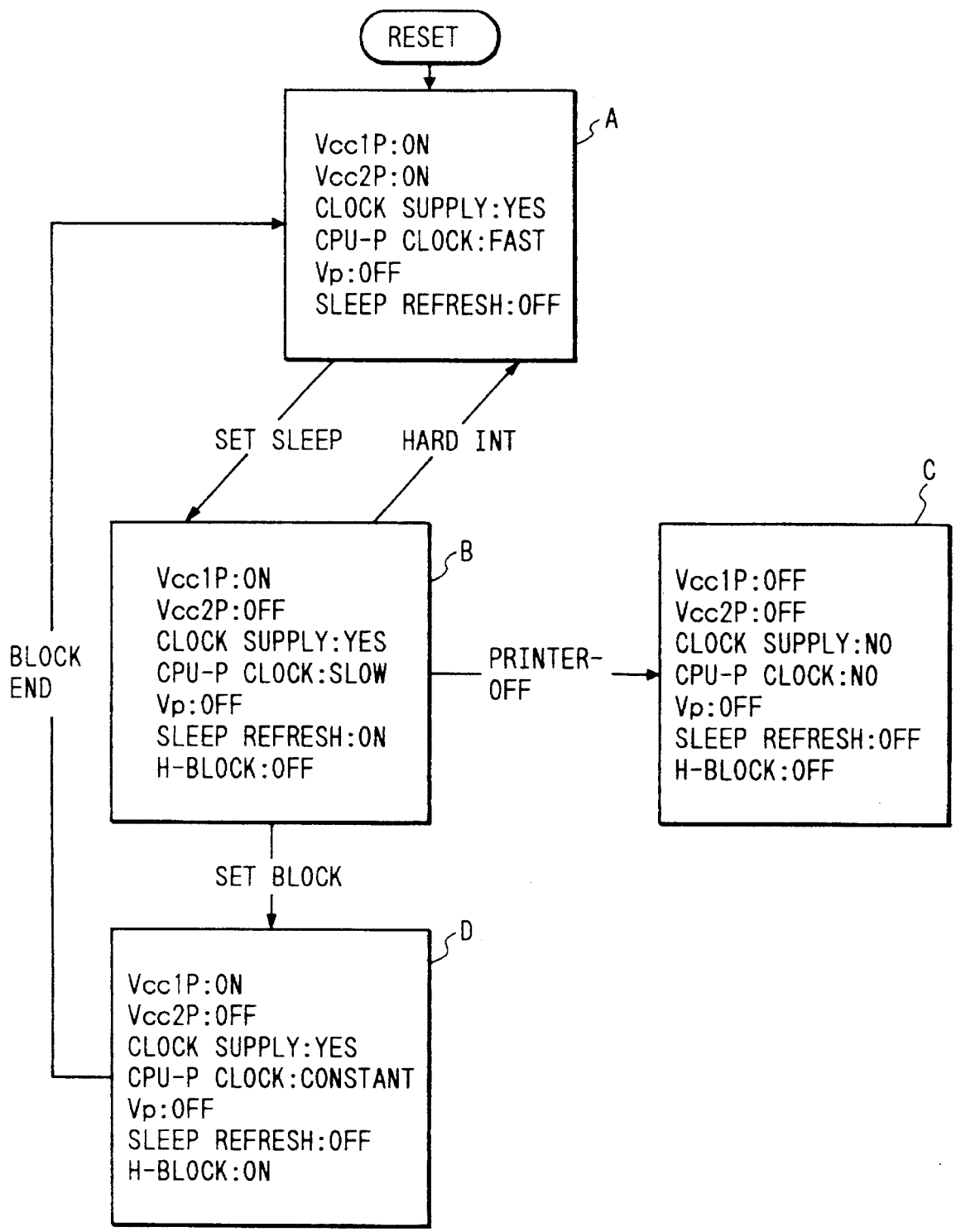
FIG. 26 is a view showing changes in a printer PM controller of the second embodiment.
Figure 28:
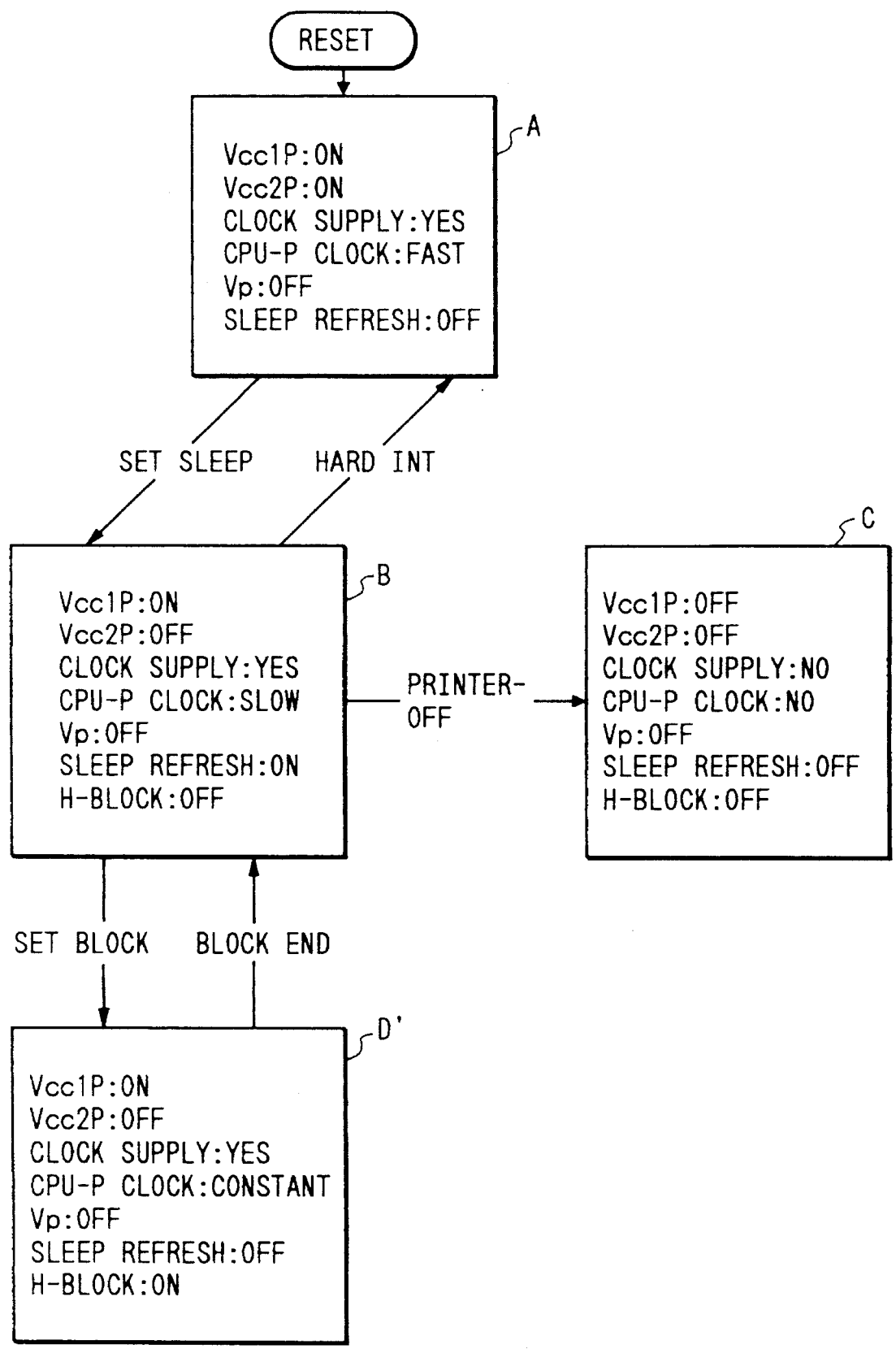
FIG. 28 is a view showing changes in states of a printer PM controller according to the third embodiment of the present invention.

In state B in each of FIGS. 23, 26, and 28, a low-speed clock is supplied to the CPU-P. This clock speed is a minimum clock speed with which register data in the CPU-P can be maintained and restored. If a static CPU-P is used, the clock can be stopped. Similarly, the RAM-P is assumed as a low-cost RAM such as a D-RAM or PS-Ram which requires refresh. However, if a RAM which does not require refresh or has a data holding mode and can restore data (i.e., a static RAM) is used, power saving can be achieved, as a matter of course. When a voltage applied to each of the CPU-P and the RAM-P in the state B is switched to a voltage which can hold data, further power saving can be achieved.

In addition, the present invention has been described mainly with reference to the personal computer as the host. However, if an arrangement in which a printer unit can be independently controlled is employed, the present invention is not limited to a specific apparatus if an apparatus (e.g., a Japanese wordprocessor and a system notebook) has a communicating means to an external device or can perform communication through a bus.

(Second Embodiment)

Figure 25:
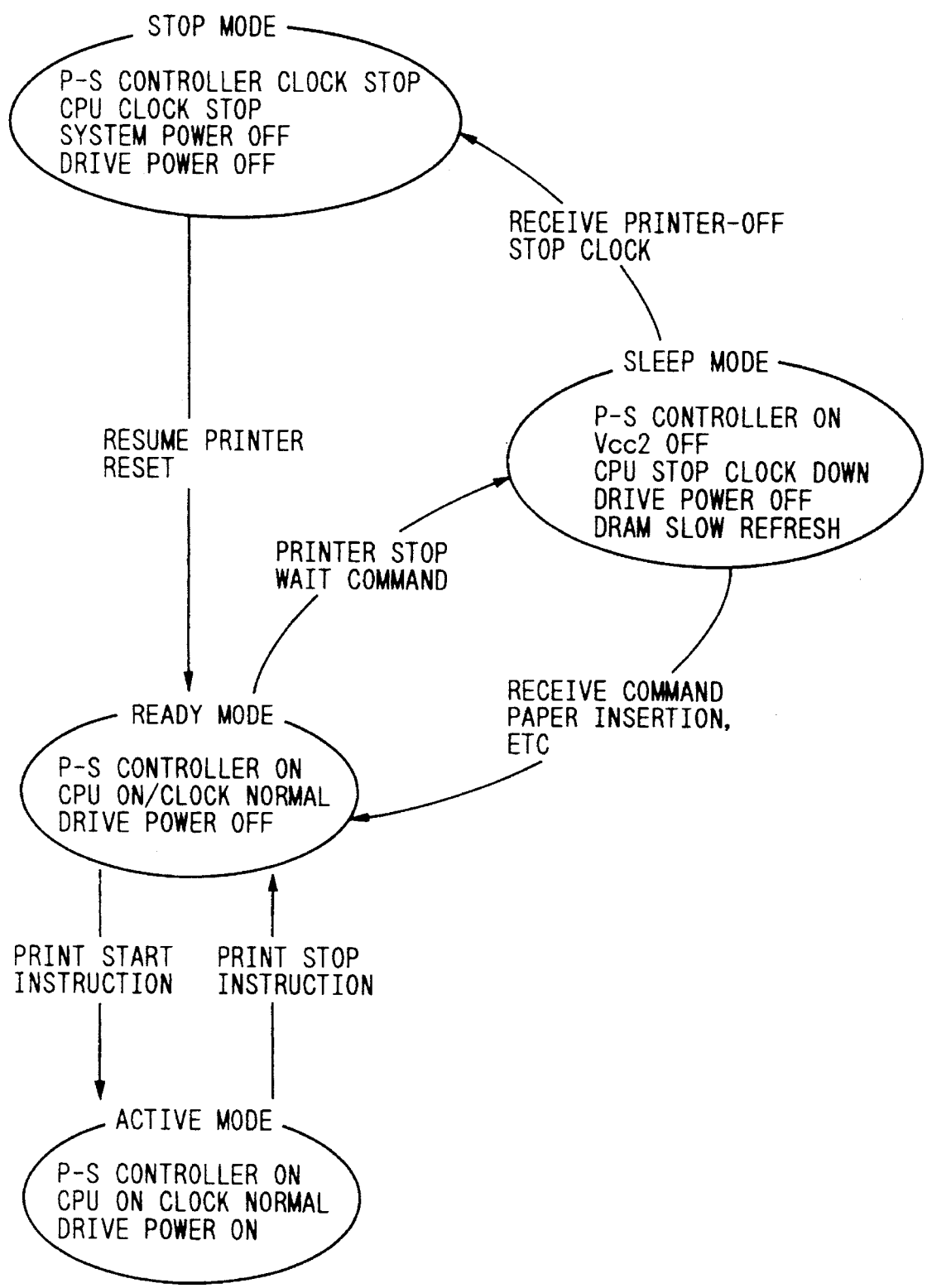
FIG. 25 is a block diagram showing an internal arrangement of a multiple control unit according to the second embodiment of the present invention.
Figure 27:
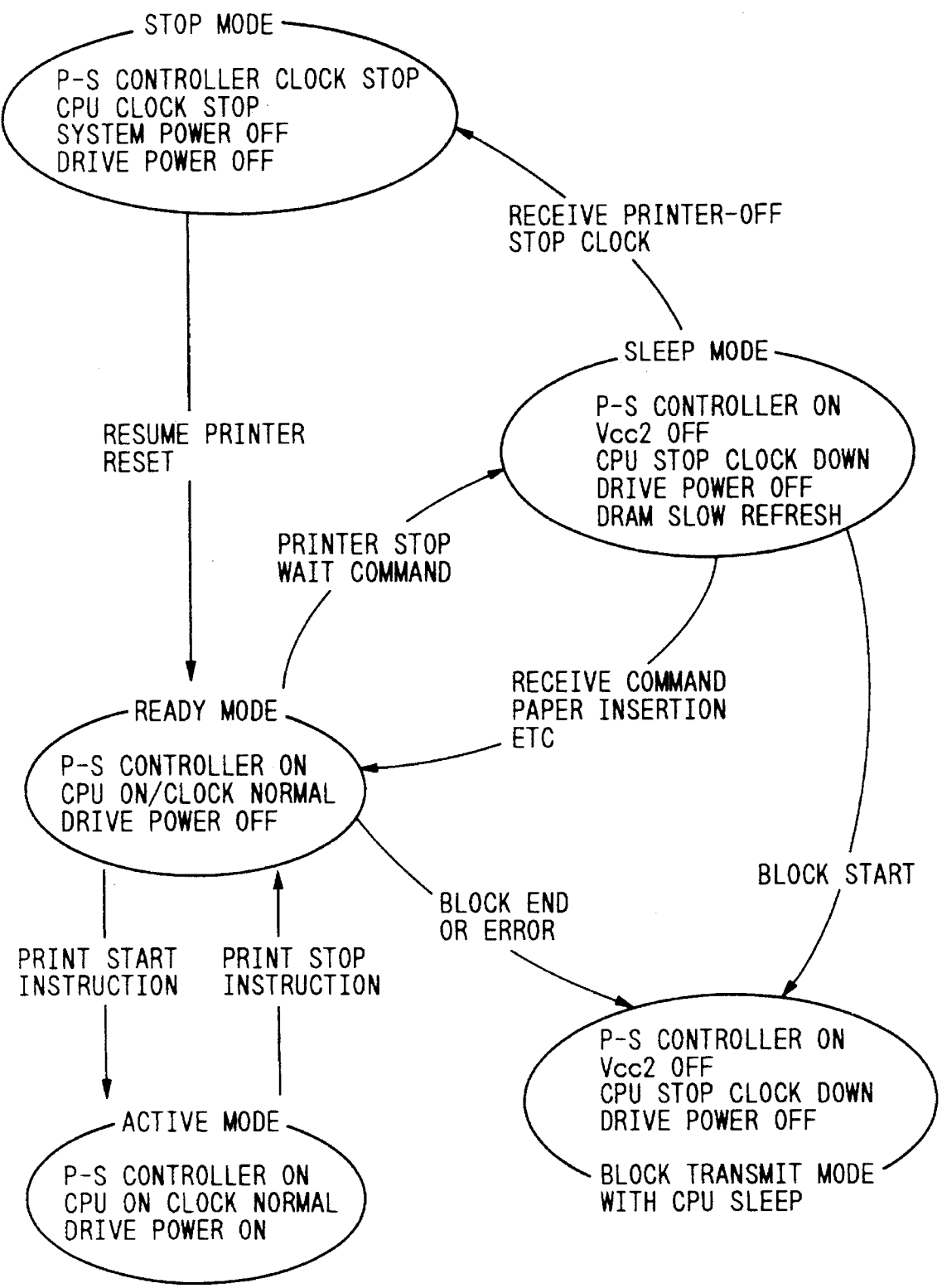
FIG. 27 is a view showing changes in states of a printer system according to the second embodiment.

A high-speed Block Transmit Mode without being through a CPU-P is added to the state shown in FIG. 27. A change of Sleep Mode→Block Transmit Mode in the Block start is achieved by a change in state of B→D in FIG. 26. A change of Block Transmit Mode→Ready Mode corresponds to a change in state of D→A in FIG. 26. Other transition states are the same as those in FIG. 24, and a detailed description thereof will be omitted. As compared with the first embodiment, since the RAM Refresh is not performed, a higher-speed Block transfer can be performed. Only a signal line H-block is added in FIG. 25, and a detailed description of the signal lines will be omitted.

(Third Embodiment)

A high-speed Block Transmit Mode without being through a CPU-P is added in the state shown in FIG. 29. A change of Sleep Mode→Block Transmit Mode at the Block start is obtained by adding a change in state of B→D in FIG. 28. A change of Block Transmit Mode→Sleep Mode corresponds to a change in state of D'→B in FIG. 28. Other transition states are the same as those in FIG. 24, and a detailed description thereof will be omitted. As compared with the first embodiment, since the RAM Refresh need not be performed, higher-speed Block transfer can be achieved.

As can be apparent from the above description, the power saving control scheme has three modes, i.e., the Active Mode for supplying at least a printer drive power to set the printer unit in a ready state, the Ready Mode for inhibiting to supply the printer drive power and allowing printer control except for printing, and the Sleep Mode for inhibiting to effect CPU control for controlling the printer unit and changing, from the Ready Mode, the Clock supplied to the CPU for controlling the printer unit. At least the changes of Active Mode→Ready Mode, Ready Mode→Active Mode, Ready Mode→Sleep Mode, and Sleep Mode→Ready Mode can be performed. At the same time, the Ready Mode is set in response to the RESET input. Therefore, at least the data exchange portion to the printer unit can perform high-speed data transfer without detecting the state of the printer. At the same time, since the printer unit is kept stopped or is powered off during a period except for the time required for printing, great power saving can be achieved.

As has been described in detail above, there is provided a method and apparatus for processing data, wherein the data processing side for performing main control and the print control side for performing power saving control are provided, the print control side performs transition of a plurality of power saving states on the basis of data transfer from the main control side so as to obtain an optimal power saving state, and the data processing side performs various control operations independently of the transition of the power saving states.

As has been described in detail above, there is provided a method and apparatus for processing data, wherein the data processing side for performing main control and the print control side for performing power saving control are provided, the print control side receives data from the data processing side in a ready state and determines the contents of the reception data, and a power saving state is set in the absence of a print instruction.

As has been described in detail above, there is provided a method and apparatus for processing data, wherein the data processing side for performing main control and the print processing side for performing power saving control are provided, the data processing side sends a power-off instruction to the print processing side, the print processing side monitors an operating state of the printer unit and powers off the printer unit if the instruction from the data processing side is a power-off instruction.

What is claimed is:

1. A data processing apparatus comprising:

data processing means for generating and transferring information on data printing;

print control means for controlling print means to print data on the basis of the information generated and transferred by said data processing means and for executing power saving control of the print means, wherein said apparatus can be operated in either one of an active mode in which the print means is supplied a print drive power and thus a printing operation is allowed, a ready mode in which the print means is supplied no print drive power and thus an operation other than the printing operation is allowed, a sleep mode in which the print means is supplied no print drive power and thus storage in a memory and a register of data used for the printing operation is allowed, and a stop mode in which the print means and said print control means are halted, wherein said data processing means causes said apparatus to shift from the stop mode to either one of the actives ready and sleep modes and from either one of the actives ready and sleep modes to the stop mode; and wherein said print control means controls said apparatus to shift from the sleep mode to the ready mode in response to the information being input, a print paper being inserted or an operation switch being actuated and shift from the ready mode to the active mode in response to a print start instruction being input.

2. The apparatus according to claim 1, wherein said data processing means and said print control means are provided in the same said apparatus.

3. The apparatus according to claim 1, further comprising:

input means for inputting data; and a timer means for measuring a time duration, wherein said print control means controls the print means to shift from the sleep mode to the ready mode in response to said data processing means transferring the information and said input means inputting the data, to shift from the ready mode to the active mode in response to the input of the print start instruction, and to shift from the active mode to the ready mode or from the ready mode to the sleep mode in response to said data processing means not transferring information and said input means not inputting data within a predetermined time duration measured by said timer means.

4. The apparatus according to claim 1, wherein said print means comprises an ink jet printer.

5. The apparatus according to claim 1, wherein the print drive power supplied to the print means is stopped in response to a status of the print means.

6. The apparatus according to claim 1, further comprising a keyboard for inputting the information.

7. The apparatus according to claim 6, further comprising a display for displaying the input information.

8. A data processing method comprising the steps of:

generating and transferring information on data printing by a data processor;

controlling, by a print controller, a printer to print data on the basis of the information generated and transferred by the data processor and for executing power saving control of the printer, wherein said method can be operated in either one of an active mode in which the printer is supplied a print drive power and thus a printing operation is allowed, a ready mode in which the printer is supplied no print drive power and thus an operation other than the printing operation is allowed, a sleep mode in which the printer is supplied no print drive power and thus storage in a memory and a register of data used for the printing operation is allowed, and a stop mode in which the printer and said print controller are halted, wherein said data processor causes said method to shift from the stop mode to either one of the active, ready and sleep modes and from either one of the active, ready and sleep modes to the stop mode; and wherein the print controller controls said method to shift from the sleep mode to the ready mode in response to the information being input, a print paper being inserted, or an operation switch being actuated and shift from the ready mode to the active mode in response to a print start instruction being input.

9. The method according to claim 8, further comprising the steps of:

inputting data by an input device; and measuring a time duration by a timer, wherein the print controller controls the printer to shift from the sleep mode to the ready mode in response to the data processor transferring the information and the input device inputting the data, to shift from the ready mode to the active mode in response to the input of the print start instruction, and to shift from the active mode to the ready mode or from the ready mode to the sleep mode in response to the data processor not transferring information and said input device not inputting data within a predetermined time duration as measured by the timer.

10. The method according to claim 9, wherein the printer is an ink jet printer.

11. The method according to claim 8, wherein the print drive power supplied to the printer is stopped in response to a status of the printer.

12. The method according to claim 8, further comprising a keyboard for inputting the information.

13. The method according to claim 12, further comprising a display for displaying the input information.

* * * * *

UNITED STATES PATENT AND TRADEMARK OFFICE
CERTIFICATE OF CORRECTION

PATENT NO. : 5,581,668

DATED : December 2, 1996

INVENTORS : Jun Oida et al.

It is certified that error appears in the above-identified patent and that said Letters Patent is hereby corrected as shown below:

IN THE DRAWINGS

Sheet 16 of 28  "INTERRUTT" should read --INTERRUPT--;
  Sheet 17 of 28  "PROGRAME" should read --PROGRAM--.

COLUMN 1

Line 16,  "saying" should read --saving--;
  Line 53,  "paper" should read --paper,--.

COLUMN 2

Line 11,  "0N" should read --ON--;
  Line 39,  Delete "a";
  Line 51,  "on" should read --ON--.

COLUMN 4

Line 43,  Delete "respectively".

UNITED STATES PATENT AND TRADEMARK OFFICE
CERTIFICATE OF CORRECTION

PATENT NO. : 5,581,668

DATED : December 2, 1996

INVENTORS : Jun Oida et al.

Page 2 of 3

It is certified that error appears in the above-identified patent and that said Letters Patent is hereby corrected as shown below:

COLUMN 5

Line 21,   "arrows and A" should read --arrows a and b. A--

COLUMN 7

Line 44,   "Delete "are";
   Line 57,   "located to" should read --allocated as--.

COLUMN 8

Line 3,    "power on" should read --power-on--;
   Line 12,   Delete "a program for loading--;
   Line 51,   "are" should read --is--;
   Line 60,   "set" should read --sent-.

COLUMN 10

Line 1,    Delete "a".

UNITED STATES PATENT AND TRADEMARK OFFICE
CERTIFICATE OF CORRECTION

PATENT NO. : 5,581,668

DATED : December 2, 1996

INVENTORS : Jun Oida et al.

It is certified that error appears in the above-identified patent and that said Letters Patent is hereby corrected as shown below:

COLUMN 11

Line 22, "being" should read --being connected--;
Line 35, "being" should read --being connected--.

COLUMN 12

Line 41, "actives" should read --active,--
Line 45, "actives" should read --active,--

COLUMN 14

Line 14, Delete "the input of".

Signed and Sealed this

Twenty-fourth Day of June, 1997

Attest:

BRUCE LEHMAN

*Attesting Officer*     *Commissioner of Patents and Trademarks*